United States Patent [19]

Kobayashi et al.

[11] Patent Number: 5,164,104

[45] Date of Patent: Nov. 17, 1992

[54] MAGNETIC MATERIAL CONTAINING RARE EARTH ELEMENT, IRON, NITROGEN, HYDROGEN AND OXYGEN AND BONDED MAGNET CONTAINING THE SAME

[75] Inventors: Kurima Kobayashi; Takahiko Iriyama; Nobuyoshi Imaoka; Akinobu Sudo; Naoko Kashiwaya, all of Fuji, Japan

[73] Assignee: Asahi Kasei Kogyo Kabushiki Kaisha, Osaka, Japan

[21] Appl. No.: 580,556

[22] Filed: Sep. 11, 1990

[30] Foreign Application Priority Data

| Sep. 13, 1989 | [JP] | Japan | 1-235822 |
| Oct. 27, 1989 | [JP] | Japan | 1-278359 |
| Oct. 27, 1989 | [JP] | Japan | 1-278360 |
| Nov. 20, 1989 | [JP] | Japan | 1-299721 |
| Jul. 23, 1990 | [JP] | Japan | 2-192884 |

[51] Int. Cl.$^5$ ............................. H01F 1/113
[52] U.S. Cl. ............................. 252/62.57; 252/62.53; 252/62.54; 252/62.55; 252/62.58; 252/62.64; 335/302; 428/403; 428/928
[58] Field of Search ............... 252/62.51, 62.55, 62.57, 252/62.58, 62.54, 62.63, 62.53, 62.64; 335/302; 428/403, 928

[56] References Cited

U.S. PATENT DOCUMENTS 3,795,541 3/1974 Lee et al. ................... 252/62.51

FOREIGN PATENT DOCUMENTS

| 0251233 | 1/1988 | European Pat. Off. |
| 0369097 | 5/1990 | European Pat. Off. |
| 58-22301 | 2/1983 | Japan | 252/62.55 |
| 58-48607 | 3/1983 | Japan | 252/62.55 |
| 60-89501 | 5/1985 | Japan | 252/62.55 |
| 60-131949 | 7/1985 | Japan |
| 60-176202 | 9/1985 | Japan |
| 62-269303 | 11/1987 | Japan |

OTHER PUBLICATIONS

Kianvash, A. et al., 20 J. Materials Science 682–688 (1985).
Buschow, K. 19 Solid State Communications 421–423 (1976).
Coey et al. "Improved Magnetic Properties by Treatment of Iron-Based Rare Earth Intermetallic Compounds in Ammonia" J. of Magnetism and Magnetic Materials 87, pp. L251–L254, 1990.

*Primary Examiner*—Jack Cooper
*Attorney, Agent, or Firm*—Finnegan, Henderson, Farabow, Garrett and Dunner

[57] ABSTRACT

A magnetic material represented by the formula $$R_\alpha Fe_{(100-\alpha-\beta-\gamma-\delta)} N_\beta H_\gamma O_\delta$$

wherein
R is at least one rare earth element inclusive of Y;
$\alpha$ is from 5 to 20 atomic percent,
$\beta$ is from 5 to 25 atomic percent,
$\gamma$ is from 0.01 to 5 atomic percent and
$\delta$ is from 3 to 15 atomic percent.

From this magnetic material, a bonded magnet can advantageously be obtained, while maintaining excellent magnetic properties of the magnetic material used for the production thereof.

18 Claims, 13 Drawing Sheets

FIG. I (i) starting alloy
(ii) starting alloy after annealing
(iii) coarse pulverization
(iv) nitriding and hydriding
(v) alloy powder after annealing
(vi) fine pulverization 5μm 5μm

MAGNETIC MATERIAL CONTAINING RARE EARTH ELEMENT, IRON, NITROGEN, HYDROGEN AND OXYGEN AND BONDED MAGNET CONTAINING THE SAME

BACKGROUND OF THE INVENTION

1. Field of the Invention

The present invention relates to a magnetic material and a process for preparing the same. More particularly, the present invention is concerned with a magnetic material comprising a rare earth element, iron, nitrogen, hydrogen and oxygen, which exhibits excellent magnetic properties, such as high residual magnetization, intrinsic coercive force and loop rectangularity as well as high magnetic anisotropy, which excellent magnetic properties have not been experienced with conventional non-sintered or non-casted magnetic materials, and is also concerned with a process for preparing the same. The magnetic material having such excellent magnetic properties can advantageously be prepared in a particulate form and therefore, the magnetic material particles of the present invention can be bonded by means of a binder to obtain a so-called bonded magnet having a desired shape and maintaining the excellent magnetic properties of the magnetic material used, differing from the conventional magnetic material which, in producing a bonded magnet therefrom, needs to be fabricated into a sintered form (which exhibits maximum magnetic properties) and then pulverized to particles followed by bonding by means of a binder, in which the pulverization step inevitably causes the magnetic properties of the final bonded magnet to be lowered. The present invention is also concerned with a bonded magnet which advantageously maintains the excellent magnetic properties of the magnetic material used 2. Description of the Prior Art Magnetic materials are widely employed, and insofar as hard magnetic materials for small actuators are concerned, there is an increased demand for smaller and stronger magnets. It has conventionally been known that rare earth magnetic materials, such as samarium-cobalt (Sm-Co) and neodymium-iron-boron (Nd-Fe-B), exhibit maximum magnetic properties when being fabricated into a sintered magnet, due to the mechanism for exerting magnetic properties Accordingly, the magnetic materials of Sm-Co and Nd-Fe-B are individually fabricated into sintered magnets and then, ground or cut into desired shapes for use as magnetic parts On the other hand, there are known bonded magnets comprised of magnetic material particles bonded together by means of a binder, which bonded magnets can advantageously be prepared in any desired shape by injection molding or compression molding of magnetic material particles without requiring grinding or cutting as in the case of sintered magnets However, when the conventional rare earth magnetic materials are employed in producing bonded magnets, it is necessary to prepare magnetic particles having a particle size as small as from about 10 to about 50 $\mu$m by pulverizing sintered magnets having been produced from the magnetic materials and then subjecting the obtained magnetic particles to molding. Therefore, not only a lowering of magnetic properties during the pulverization of the sintered magnet but also an increase in cost due to the requirement of such an additional step, is unavoidable.

In these situations, developing of magnetic materials in a particulate form having a small particle size, e.g., less than 10 $\mu$m and exhibiting high magnetic properties has been desired in the art so that bonded magnets having satisfactory magnetic properties can be obtained.

The present inventors previously proposed a magnetic material represented by the formula:

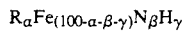

or

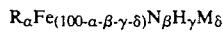

wherein

R is at least one rare earth element inclusive of Y,

M is at least one additive selected from the group consisting of Sn, Ga, In, Bi, Pb, Zn, Al, Zr, Cu, Mo, Ti, Si, MgO, Al$_2$O$_3$, Sm$_2$O$_3$, AlF$_3$, ZnF$_2$, SiC, TiC, AlN and Si$_3$N$_4$, $\alpha$ is from 5 to 20 atomic percent, $\beta$ is from 5 to 30 atomic percent, $\gamma$ is from 0.01 to 10 atomic percent and $\delta$ is from 0.1 to 40 atomic percent (see European Patent Application Publication No. 0 369 097A1). This proposal was made, based on the novel finding that the nitriding and hydriding of a pulverized alloy containing a rare earth metal and iron and the incorporation of a specific metal species and/or specific inorganic compound which is defined as M in the above formula can provide particulate magnetic materials having improved magnetic properties. These particulate magnetic materials can be not only fabricated into sintered magnets, but also can be bonded together by means of a binder to provide bonded magnets. In preparing the above-mentioned system of magnetic materials, fine pulverization, after the nitriding and hydriding, of the coarsely pulverized materials must be conducted in an atmosphere of inert gas so that inclusion of oxygen into the material is prevented.

The present inventors have made further investigations on the above-mentioned nitride-hydride type of magnetic materials in order to further improve the magnetic properties thereof. As a result, it has unexpectedly been found that when the fine pulverization of the material after being nitrided and hydrided is performed in an organic medium having an extremely limited amount of oxygen dissolved therein or in an oxygen-containing inert gas atmosphere having an extremely limited partial pressure of oxygen, a magnetic material having remarkably improved magnetic properties can be obtained. This is surprising in view of a common knowledge in the art such that inclusion of oxygen into a magnetic material as well as oxidation of a magnetic material must be prevented. The present invention has been completed, based on such an unexpected novel finding.

SUMMARY OF THE INVENTION

It is, therefore, an object of the present invention to provide a magnetic material having high magnetic properties, e.g., high saturation magnetization, residual magnetization, intrinsic coercive force and loop rectangularity as well as high magnetic anisotropy.

It is another object of the present invention to provide a particulate magnetic material having particle size as small as less than 10 $\mu$m and exhibiting excellent magnetic properties so that a bonded magnet can be easily produced directly therefrom by molding.

It is a further object of the present invention to provide a bonded magnet having a desired shape and exhibiting excellent magnetic properties.

The foregoing and other objects of the present invention will be apparent to those skilled in the art from the following detailed description and appended claims, taken in connection with the accompanying drawings.

In the present invention, the magnetic properties include saturation magnetization (hereinafter referred to simply as "$4\pi Is$"), residual magnetization (hereinafter referred to simply as "Br"), intrinsic coercive force (hereinafter referred to simply as "iHc"), loop rectangularity (hereinafter referred to simply as "$Br/4\pi Is$") and maximum energy product [hereinafter referred to simply as "(BH)max"], and also include magnetic anisotropy ratio In the present invention, the "magnetic anisotropy ratio", which is a factor in the art, is defined as the ratio ($\sigma_\perp/\sigma_{//}$) of the magnetization in the direction of hard magnetization ($\sigma_\perp$) to that in the direction of easy magnetization ($\sigma_{//}$) at 15 kOe, and it is desired that the magnetic anisotropy ratio be as low as possible, differing from the generally employed magnetic anisotropy which is desired to be as high as possible.

DETAILED DESCRIPTION OF THE INVENTION

Figure 1:
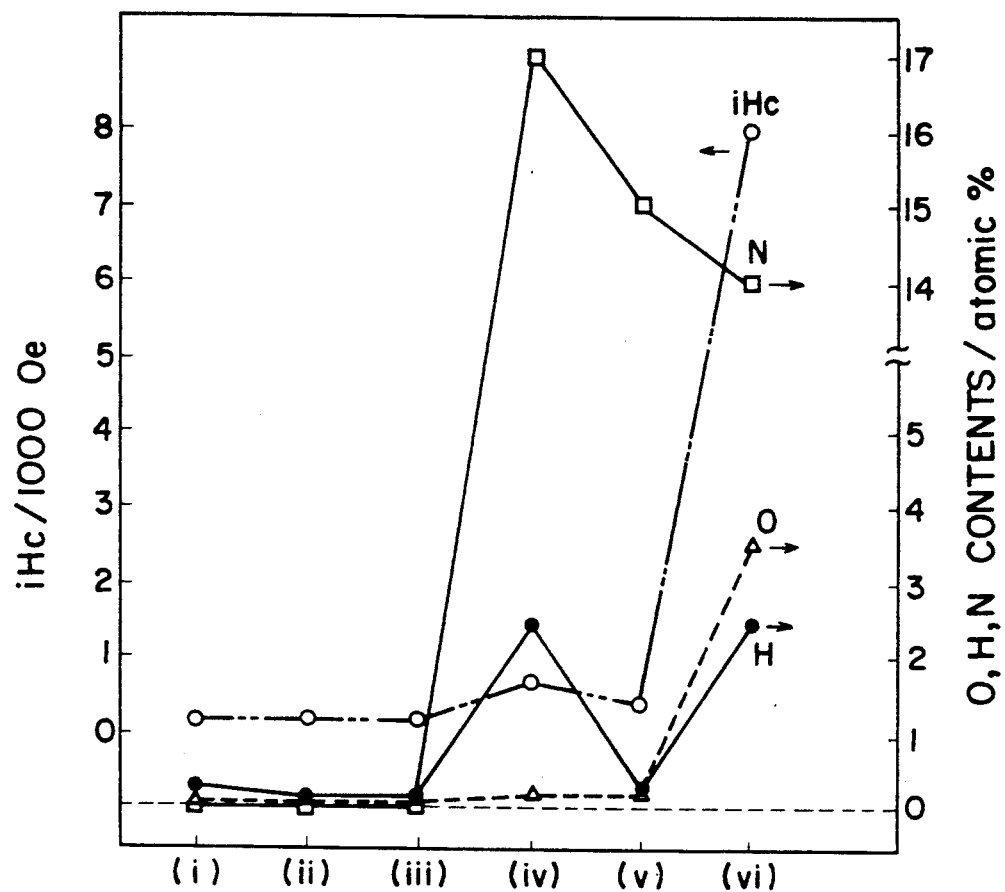
FIG. 1 is a graph showing the various oxygen, hydrogen and nitrogen contents and the corresponding iHc values of the starting alloy and the alloy powder obtained in each step in Examples 2 for preparing a magnetic material of the present invention.

In one aspect of the present invention there is provided a magnetic material represented by the formula:

$$R_\alpha Fe_{(100-\alpha-\beta-\gamma-\delta)} N_\beta H_{65} O_\delta \qquad (I)$$ 

wherein
R is at least one rare earth element inclusive of Y;
$\alpha$ is from 5 to 20 atomic percent,
$\beta$ is from 5 to 25 atomic percent,
$\gamma$ is from 0.01 to 5 atomic percent and
$\delta$ is from 3 to 15 atomic percent.

In another aspect of the present invention, there is provided a process for preparing a magnetic material represented by formula (I) above, which comprises the steps of:

(a) pulverizing an alloy of, by atomic percent, 5 to 25R - 75 to 95 Fe composition in an inert gas atmosphere to obtain precursor particles having a particle size of from 20 $\mu$m to 1000 $\mu$m;

(b) contacting the precursor particles with an ammonia-containing gas or with nitrogen gas and hydrogen gas at a temperature of from 100° C. to 650° C. to perform nitriding and hydriding of the precursor particles;

(c) annealing the nitrided and hydrided precursor particles in vacuum or in an inert gas atmosphere having a partial pressure of oxygen of less than $10^{-2}$ atm at a temperature of from 100° C. to 650° C.; and (d) pulverizing the annealed particles in an organic medium having oxygen dissolved therein in an amount of from 0.1 ppm to 1000 ppm and containing water in an amount of from 0.0001 to 3 percent by weight or in an oxygen-containing inert gas atmosphere having an oxygen partial pressure of from 0.05 to 5% based on the total pressure of the atmosphere, to thereby obtain particles, at least 50 percent by volume of which are single magnetic domain grains having a particle size of from 1 μm to 5 μm.

In a further aspect of the present invention, there is provided a bonded magnet comprising:

particles of at least one magnetic material represented by formula (I) above, at least 50 percent by volume of the particles being single magnetic domain grains having a particle size of from 1 μm to 5 μm, and a binder interspersed between the particles to bond the particles together.

The rare earth elements R which can be employed in the present invention include light and heavy rare earth elements inclusive of Y and may be employed individually or in combination. Representative examples of rare earth elements R include Nd, Pr, La, Ce, Tb, Dy, Ho, Er, Eu, Sm, Gd, Tm, Yb, Lu and Y, and mixtures of two or more rare earth elements, such as Mischmetal and didymium. These rare earth elements R which can be employed in the present invention may not always be pure and may contain impurities which are inevitably entrained in the course of the production thereof. Of these rare earth elements R, preferred are Sm, Ce, Nd, Gd, didymium, and Sm alloys, such as Sm-Nd, Sm-Gd, Sm-Ce, Sm-Dy and Sm-Y.

The amount of R is from 5 to 20 atomic percent, preferably from 8 to 9.5 atomic percent. When the amount of R is less than 5 atomic percent, the iHc value is decreased. On the other hand, when the amount of R is more than 20 atomic percent, the $4\pi Is$ value is decreased.

The amount of nitrogen is from 5 to 25 atomic percent, preferably from 13 to 18 atomic percent. When the amount of nitrogen is less than 5 atomic percent, the magnetic anisotropy ratio is disadvantageously increased and as a result, the iHc value is extremely decreased. On the other hand, when the amount of nitrogen is more than 25 atomic percent, the iHc and $4\pi Is$ values are decreased and the magnetic anisotropy ratio is increased, which is not desirable for practical permanent magnets.

The amount of hydrogen is from 0.01 to 5 atomic percent, preferably 1 to 5 atomic percent When the amount of hydrogen is less than 0.01 atomic percent, the magnetic properties are lowered. On the other hand, when the amount of hydrogen is more than 5 atomic percent, the iHc value is decreased.

The amount of oxygen is from 3 to 15 atomic percent, preferably from 3 to 6 atomic percent. The oxygen content in the range of from 3 to 6 atomic percent is obtained by the fine pulverization step (which is described below) involved in the production process of the present invention. The oxygen content beyond such a range can be obtained by heat treatment. When the amount of oxygen of the magnetic material of the present invention is increased by heat treatment, the iHc value is decreased. However, the iHc value begins to be and continues to be regained as from a certain oxygen content and reaches a plateau region, which is generally attained at an oxygen content of from about 12 to 15 atomic percent. For example, when the amount of oxygen of the magnetic material obtained in Example 6 described later is increased by heat treatment, the iHc value is decreased until the oxygen content reaches about 8 atomic percent, and thereafter begins to be and continues to be regained When the oxygen content becomes about 12 atomic percent, the iHc value reaches a plateau region in which about 70% of the iHc value attained by the magnetic material having an oxygen content of from 3 to 4 atomic percent is maintained until the oxygen content becomes 15 atomic percent (see FIG. 15).

In the magnetic material of the present invention, at least 80 atomic percent of oxygen based on the total amount of the oxygen are present concentratedly in a surface portion of the respective particle. The surface portion is defined as a portion extending from the surface of the particle to a depth of 1000Å, preferably 700Å, more preferably 500Å.

The major component of the magnetic material of the present invention is iron and the amount of iron is from 35 to 86.9 atomic percent, preferably 50 to 86 atomic percent. It is more preferred that the amount of iron is 66 to 77 atomic percent, when the magnetic material of the present invention is prepared by the nitriding and hydriding of either an alloy of rhombohedral $R_2Fe_{17}$ structure wherein R is at least one rare earth element selected from the group consisting of Ce, Pr, Nd, Sm and Gd or an alloy of hexagonal $R_2Fe_{17}$ structure wherein R is at least one rare earth element selected from the group consisting of Tb, Dy, Ho, Er, Eu, Tm, Yb, Lu and Y.

In the present invention, in order to further increase the Curie temperature of the magnetic material, the iron atoms may be partly substituted by cobalt atoms in a substitution ratio of from 0.01 to 49 atomic percent of the iron atoms The magnetic material is preferably in the form of particles, at least 50 percent by volume, preferably 80 percent by volume, of which are single magnetic domain grains having a particle size of from 1 to 5 μm.

The magnetic material of the present invention exhibits excellent magnetic properties such that when the magnet material of the present invention is fabricated into a bonded mass having a magnet material content of 80% by volume by compacting-molding, followed by magnetization in a pulse magnetic field of at least 30 kOe, preferably about 60 kOe, the resultant bonded magnet exhibits a residual magnetization (Br) of at least 7 kG, generally as large as from 7 to 12 kG, an intrinsic coercive force (iHc) of at least 5000 Oe, generally as large as from 5000 to 12000 Oe and a loop rectangularity ($Br/4\pi Is$) of at least 85%, generally as large as from 85 to 99%. The bonded magnet also exhibits a magnetic anisotropy ratio of not greater than 0.6, generally as small as from 0.15 to 0.60.

As mentioned above, the magnetic material of the present invention can be prepared by the process which comprises the steps of (a) pulverizing an alloy of, by atomic percent, 5 to 25R - 75 to 95 Fe composition in an inert gas atmosphere to obtain precursor particles having a particle size of from 10 μm to 1000 μm;

(b) contacting the precursor particles with an ammonia-containing gas or with nitrogen gas and hydrogen gas at a temperature of from 100° C. to 650° C. to perform nitriding and hydriding of the precursor particles;

(c) annealing the nitrided and hydrided precursor particles in vacuum or in an inert gas atmosphere having a partial pressure of oxygen of less than $10^{-2}$ atm at a temperature of from 100° C. to 650° C.; and (d) pulverizing the annealed particles in an organic medium having oxygen dissolved therein in an amount of from 0.1 ppm to 1000 ppm and containing water in an amount of from 0.0001 to 3 percent by weight or in an oxygen-containing inert gas atmosphere having an oxygen partial pressure of from 0.05 to 5% based on the total pressure of the atmosphere, to thereby obtain particles, at least 50 percent by volume of which are single magnetic domain grains having a particle size of from 1 μm to 5 μm.

The production process will be described in detail hereinbelow.

In the present invention, the "particle size" of particles of various materials is defined as follows. The particles are observed by scanning electron microscopy and a photomicrograph (×4000) is taken. The long-axis diameters of the particles are measured on the photomicrograph with respect to at least 500 particles. The obtained long-axis diameter are classified into six groups, i.e., groups of less than 1 μm, 1 to 2 μm, 2 to 3 μm, 3 to 4 μm, 4 to 5 μm and more than 5 μm. With respect to the particles of the respective groups other than the group of more than 5 μm, the particle sizes are, respectively, defined as 0.5 μm, 1.5 μm, 2.5 μm, 3.5 μm and 4.5 μm. With respect to the group of more than 5 μm, an arithmetic mean of the measured diameters is defined as a particle diameter.

A volume fraction of a certain particle size can be obtained as follows. The total volume ($V_{total}$) of the particles is represented by the formula:

$$V_{total} = \sum_i \frac{4}{3} \pi n_i \left(\frac{r_i}{2}\right)^3$$

wherein $n_i$ is the number of particles of each class by the above classification and $r_i$ is an average radius of the particles of each class by the above classification.

The volume fraction (F) of particles having a particle size in the range of, for example, from 1 to 5 μm can be obtained by the formula:

$$F = \frac{V_{1-5}}{V_{total}}$$

wherein $V_{total}$ is as defined above and $V_{1-5}$ is the total volume of particles having a particle size of from 1 to 5 μm.

The production process comprises the following steps.

(1) Preparation of Starting Alloy (R-Fe Alloy)

Iron and at least one rare earth element are alloyed by high frequency melting, arc melting or melt spinning in an inert gas atmosphere, such as argon, to give a starting alloy. It is preferred that the amount of the rare earth element be 5 to 25 atomic percent and the amount of the iron be 75 to 95 atomic percent. When the amount of the rare earth element is less than 5 atomic percent, a large amount of α-Fe phase is present in the alloy and accordingly, high iHc cannot be obtained Also, when the amount of the rare earth is more than 25 atomic percent, high 4πIs cannot be obtained.

As mentioned above, cobalt can also be alloyed together with the iron and the rare earth element in the preparation of the starting alloy. When cobalt is alloyed with the rare earth element and iron, it is preferred that the amount of the cobalt do not exceed 49 atomic percent of the iron.

The preparation of a starting alloy is usually carried out by rapidly cooling the above-obtained melt mixture of iron and at least one rare earth element.

For example, in the preparation of an alloy having a composition formula of $Sm_2Fe_{17}$, firstly, Fe having a purity of 99.9 % is weighed and placed in a ceramic crucible and melted under a reduced pressure of about $10^{-4}$ atm and secondly, Sm having a purity of 99.9% is weighed and mixed with the melted Fe in an argon gas atmosphere under a reduced pressure of −30 mmHg and the mixture thus obtained is melt mixed for 5 minutes at a temperature of about 1600° C. The melt thus obtained is maintained at a temperature of 1500° C. to 1600° C. The viscosity of the melt delicately varies depending on this temperature and also, the flowability of the melt in a metal mold varies depending on the temperature of the melt.

As is understood from the phase diagram of Sm-Fe starting alloy described in *Iron-Binary Phase Diagrams*, Ortrud Kubaschewski, Springer-Verlag (1982), p. 105 when a melt of Fe and Sm maintained at a temperature of 1500° C. to 1600° C. is poured into a metal mold for rapid cooling, the α-Fe phase precipitates at a temperature ranging from about 1450° C. to 1280° C. and the desired $Sm_2Fe_{17}$ phase precipitates at a temperature below 1280° C. while the $Sm_1Fe_3$ phase precipitates below 1010° C. The starting alloy thus obtained is composed mainly of three phases, i.e., α-Fe phase, $Sm_2Fe_{17}$ phase and $Sm_1Fe_3$ phase. When this starting alloy is annealed at a temperature ranging from 800° C. to 1300° C. for 2 to 48 hours in an inert gas, such as argon gas, the α-Fe phase and $Sm_1Fe_3$ phase gradually disappear by mutual diffusion to give an alloy composed mainly of the $Sm_2Fe_{17}$ phase which is homogeneous (which can be confirmed by X-ray diffraction).

The microstructures of the starting alloy, i.e., the crystal size, the phase separation at crystal grain boundaries and the phase morphology, remarkably vary depending on the annealing conditions during the annealing.

For example, when the melt spinning is employed, the starting $Sm_2Fe_{17}$ alloy having an average crystal size of less than 5 μm after the annealing can be obtained. On the other hand, when the melt mixture of Fe and Sm in a high frequency furnace is poured into a metal mold, the sizes of the α-Fe phase and the $Sm_1Fe_3$ phase separated are large and, for obtaining a starting alloy composed only of the $Sm_2Fe_{17}$ phase, it is necessary to carry out the annealing at a comparatively high temperature for a long period of time, so that the staring alloy thus obtained has an average crystal size of 150 μm or more than 150 μm and high crystallinity.

It is preferred that the starting alloy consist only of the $Sm_2Fe_{17}$ phase in the above case. It is possible to vary the crystal size of the starting material in the range of from 5 μm or less than 5 μm to about 300 μm. Practically, the crystal size obtained is 30 μm to 150 μm. The microstructure of the starting alloy is closely related not only with the mechanical properties of the starting alloy, such as strength, hardness and softness, but also with the crystallinity and the reactivity of the starting material with nitrogen, hydrogen and oxygen in the subsequent treatments and affects the various properties including the magnetic properties of the magnetic materials (see FIGS. 17 to 19).

(2) Coarse Pulverization

In order to uniformly carry out the subsequent nitriding and hydriding, the starting alloy is coarsely pulverized in a jaw crusher, a stamp mill or coffee mill in an inert atmosphere such as nitrogen and argon to obtain particles having a particle size of from 10 $\mu$m to 1000 $\mu$m, preferably from 30 $\mu$m to 100 $\mu$m.

The conditions for this coarse pulverization depend on the microstructure of the starting alloy as described above. The starting alloy having a comparatively small average crystal size of from about 5 to 30 $\mu$m is usually hard and requires a large stress and a long period of time for coarse pulverization thereof, and the shape of the pulverized particles is nearly spherical and the pulverization appears to occur by intergranular fracture. Also, the starting alloy having an average crystal size grown to 150 $\mu$m can be pulverized by this coarse pulverization but a large amount of particles having sharp edges by transgranular fracture are observed among the pulverized particles. That is, the size and the shape of the pulverized particles greatly vary depending on the microstructure of the starting alloy and the pulverization method and affect the performances of the subsequent treatment.

(3) Nitriding and Hydriding of Starting Alloy

The methods for the nitriding and hydriding of the starting alloy which can be employed in the present invention, include a one-step method in which the coarsely pulverized starting alloy powder is contacted with ammonia gas or a mixed gas of ammonia and at least one gas selected from the group consisting of hydrogen, helium, neon, argon and nitrogen at elevated temperature at a pressure of from 1 to 10 atm; and a two-step method comprising contacting the coarsely pulverized starting alloy powder with hydrogen gas or a mixed gas of hydrogen and at least one gas selected from the group consisting of helium, neon, argon and nitrogen at elevated temperature to conduct the hydriding and then contacting the hydrogen-absorbed alloy powder with ammonia gas or a mixed gas of ammonia and at least one gas selected from the group consisting of hydrogen, helium, neon, argon and nitrogen at elevated temperatures at a pressure of from 1 to 10 atm to conduct the nitriding of the hydrogen-absorbed alloy powder, or comprising contacting the starting alloy powder with nitrogen gas, ammonia gas or a mixed gas nitrogen or ammonia and at least one gas selected from the group consisting of helium, neon and argon at elevated temperatures at a pressure of from 1 to 10 atm to conduct the nitriding and then contacting the nitrogen-absorbed alloy powder with hydrogen or a mixed gas of hydrogen and at least one gas selected from the group consisting of helium, neon, argon and nitrogen at elevated temperatures at a pressure of from 1 to 10 atom to conduct the hydriding of the nitrogen-absorbed alloy powder.

Of these methods, one-step method is preferred since the nitriding and the hydriding can be completed in 10 to 20 minutes. Of the above two-step methods, preferred is a method in which the hydriding of the alloy powder is firstly conducted and the nitriding of the hydrogen-absorbed alloy powder is then conducted.

The nitrogen and hydrogen contents of the starting alloy can be controlled by appropriately choosing the type of the contacting gas or the mixing ratio of ammonia and hydrogen employed and appropriately choosing the temperature, the pressure and the contacting period of time. When the one-step method is employed, it is preferred to use a mixed gas of ammonia and hydrogen. The mixing ratio of ammonia and hydrogen may vary depending on the contacting conditions and, it is preferred that the partial pressure of ammonia be 0.02 to 0.75 atm and the partial pressure of hydrogen be 0.98 to 0.25 atom with a total pressure of the mixed gas of 1 atm. The contacting temperature is from 100° C. to 650° C. When the contacting temperature is below 100° C., the rate of the nitriding and hydriding is small. On the other hand, when the contacting temperature is above 650° C., iron nitrides are likely to be formed to decrease the magnetic properties. The presence of oxygen in the contacting atmosphere lowers the magnetic properties and, accordingly, it is necessary to decrease the partial pressure of oxygen to an extent as small as possible A mixed gas containing a gas other than ammonia gas as the major component gas can be employed in the present invention, but the rate of the nitriding is generally decreased. However, it is possible to conduct the nitriding and hydriding of the starting alloy, for example, with a mixed gas of hydrogen gas and nitrogen gas by employing a long period of time ranging from 4 to 50 hours.

(4) Annealing

After the nitriding and hydriding, the alloy powder is annealed in vacuum or in an inert gas atmosphere having a partial pressure of oxygen of less than $10^{-2}$ atm at a temperature of 100° C. to 650° C. The deterioration of the magnetic properties of the magnetic material is brought about due to the lack of homogeneity of the composition of the magnetic material containing nitrogen and hydrogen and the presence of the defects in crystals. These disadvantages can be eliminated by the annealing for from about 1 to 3 hours. The inert gas atmosphere which can be employed is preferably argon gas or helium gas.

(5) Fine Pulverization

The alloy powder after the annealing is finely pulverized to particles having a particle size of from 1 $\mu$m to 5 $\mu$m in an organic medium by various methods such as ball milling, planetary ball milling, vibrating ball milling and wet milling. Fine pulverization may alternatively be performed in an oxygen-containing inert gas (such as argon) atmosphere having an oxygen partial pressure of from 0.05 to 5% based on the total pressure of the atmosphere, by employing, for example, jet milling or ball milling.

The organic medium which can be employed contains 0.1 ppm to 1000 ppm of oxygen dissolved therein and 0.0001 to 3 percent by weight of water. The oxygen and the water of the organic medium affect the oxygen content and the state of oxygen in the final magnetic material. Suitable examples of such organic media include carbon tetrachloride, chloroform, hydrocarbons, such as cyclohexane, n-hexane, n-octane, n-decane, and petroleum benzine, silicone oil and alcohols, such as methanol and ethanol.

The fine pulverization in the process of the present invention has three advantages. First, single magnetic domain grains can be obtained Conventionally, it is difficult to selectively obtain particles having substantially the same particle size as the size of the single magnetic domain by pulverization When at least 50 percent by volume, preferably 80 percent by volume, of the particles have a particle size in the neighborhood of the size of the single magnetic domain, i.e., 1 μm to 5 μm, all of the particles sufficiently act as single magnetic domain grains Second, the excellent magnetic properties of the magnetic material of the present invention can be exerted due to the effect of "cleaning" of the surfaces of the finely pulverized particles. As is shown in Examples, the oxygen content of the magnetic material of the present invention increases as the particles are more finely pulverized, to thereby increase the iHc (see FIGS. 2 to 9). Therefore, the "cleaning" of the surfaces of the finely pulverized particles in the present invention is effected by the adsorption of oxygen on or the reaction of oxygen in the surfaces of the particles. Thus, it is necessary that the organic medium employed in the fine pulverization contain an adequate amount of oxygen or water to supply oxygen to the particles of the magnetic material. Likewise, it is necessary that the oxygen-containing inert gas atmosphere contain an adequate amount of oxygen.

Third, mechanical damages to each particles during the fine pulverization by the above described method are small.

(6) Heat Treatment

Figures 14, 15:
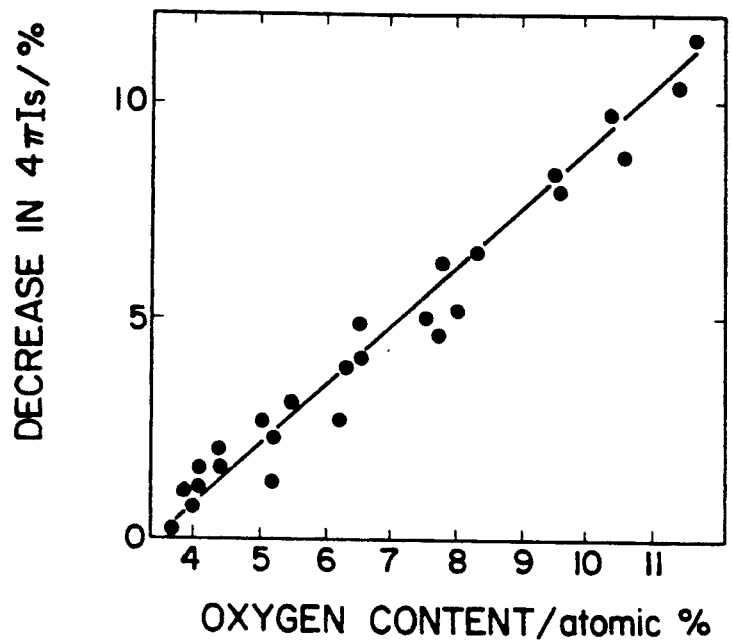
FIG. 14 is a graph showing the relationships between the oxygen contents of the alloy powder samples after the heat treatment in air (Example 6) and the $4\pi Is$ decrease ratios of the alloy powder samples.
FIG. 15 is a graph showing the relationships between the oxygen contents of the alloy powder samples after the heat treatment in air (Example 6) and the iHc decrease ratios of the alloy powder samples.

When the alloy powder after the fine pulverization is further subjected to heat treatment at a temperature of 50° C. to 500° C. in an atmosphere having a partial pressure of oxygen of from $10^{-5}$ atm to 0.21 atm, the oxygen content is increased with the iHc being decreased, but when the oxygen content becomes 12 to 15 atomic percent, the iHc is regained and reaches a plateau region in which about 60% to 70% of the iHc of the alloy powder before the heat treatment is obtained (see FIG. 15). The alloy powder after the heat treatment is excellent in resistance to corrosion.

(7) Classification

Furthermore, in the present invention, it is effective for obtaining magnetic materials having further improved magnetic properties to classify the particles into at least two groups, preferably four to ten groups, by particle size in, for example, about 10 μm increments after the coarse pulverization (2) or before the fine pulverization (5) or both after the coarse pulverization (2) and before the fine pulverization (5) and to employ at least one of the classified groups in the subsequent treatments or treatment. This effect of classification is remarkably exerted when the group of particles having an average particle size similar to the average crystal size of the starting alloy is employed.

In the coarse pulverization, the average particle size and particle size distribution vary depending on the starting alloy employed and the coarse pulverization method, and the defects in crystals due to the mechanical stress and the change in the composition due to the oxidation of the surfaces of the particles are frequently observed in the pulverized particles. Therefore, when the magnetic materials are formed by the solid phase-gas phase reaction, particles having no defects in crystals and in surfaces are preferred. If the coarsely pulverized particles have a particle size distribution widely ranging, for example, from 0.1 μm to 100 μm, the particles of small size are likely suffer from damages, such as defects in crystals and so on. Accordingly, when particles having a specific particle size, for example, a size less than 50 μm are excluded by classification with a sieve, the magnetic properties of the magnetic material finally obtained through the subsequent treatments can be improved.

During the nitriding and hydriding and the subsequent annealing, the gas-absorbing pulverization or the thermal shocking pulverization occur, so that the resultant particles are caused to have a broad particle size distribution. This means that variation occurs in the magnetic properties depending on the particle size. In order to eliminate this variation in magnetic properties, the classification of particles by particle size is effective.

The classification of particles by particle size can be conducted by means of mechanical meshes or jet mill.

For example, when the average crystal size of a starting alloy after the annealing is about 50 μm, the single crystal size of the $Sm_2Fe_{17}$ phase is about 50 μm and such single crystal gathers to form the starting alloy. Then this starting alloy is coarsely pulverized to form particles having a particle size distribution of, for example, 20 μm to 100 μm, subjected to nitriding and hydriding and annealed to obtain alloy powder. Subsequently the alloy powder is classified into 7 to 8 groups of particles by particle size by using sieves of, for example, 20 μm to 106 μm and the magnetic properties of the respective groups are measured As a result, the alloy powder having an average particle size of from 40 μm to 50 μm which is similar to the average crystal size of the starting alloy before nitriding and hydriding exhibits maximum magnetic properties (see FIGS. 17 and 18). This fact shows that particles, which are of single crystal domain grains, obtained by the intergranular fracture of the starting alloy exhibit high magnetic properties.

When the above-described classification of the particles by particle size is carried out before the fine pulverization, the effects similar to those as described above can be obtained.

Figure 19:
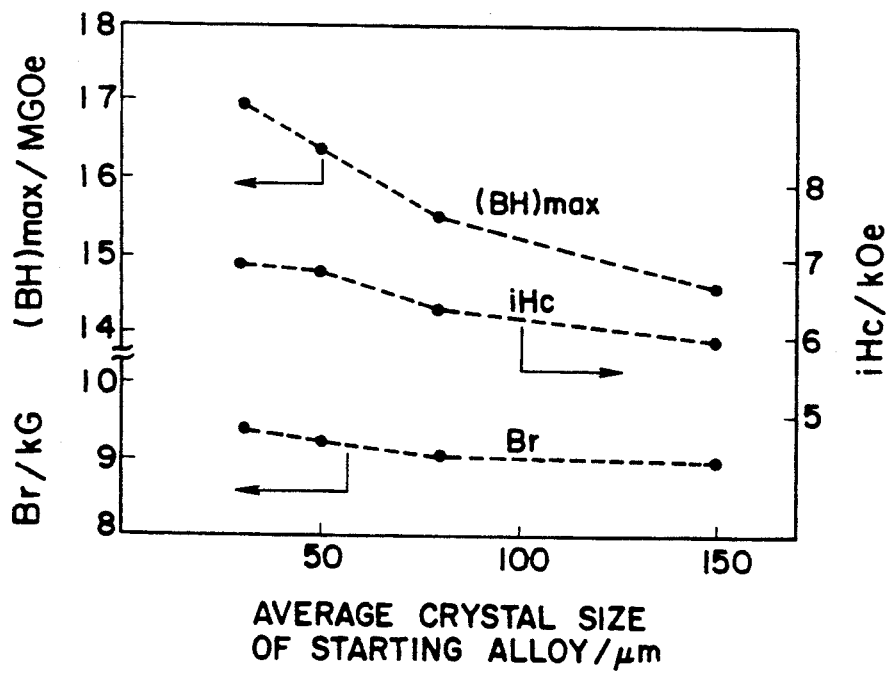
FIG. 19 is a graph showing the relationships between the average crystal size of the starting alloy and the magnetic properties of the compacting-molded magnet obtained from the finely pulverized alloy powder originating from the above starting.

Further, when the coarsely pulverized particles (having an average particle size of 50 μm) of the annealed starting alloy having an average crystal size of, for example, 30 μm to 150 μm after being nitrided and hydrided and then annealed, are finely pulverized according to the process of the present invention in order to obtain particles having a particle size distribution of 1 μm to 5 μm, the resultant particles exhibit high magnetic properties (see FIG. 19).

These results show that the crystal size of the annealed starting alloy affects not only the magnetic properties of the coarsely pulverized particles but also those of the finely pulverized particles.

Following is the production process for bonded magnets.

The binders which can be employed in the present invention are chosen from the following five groups.

Group I: natural rubber, polychloroprene, nitrilebutyl rubber, polyisobutyrene, silicone rubber, polyisoprene rubber and mixtures thereof.

Group II: epoxy resin, phenol resin, synthetic rubber, polyester resin, urea resin.

Group III: polyamide, polyethylene terephthalate, polybutyrene terephthalate, polyetheretherketone, polyphenylene sulfide, liquid crystal polymer, polyphenylene oxide polycarbonate, polyethersulfone, polyethylene, poly propylene, ethylene-vinyl acerate copolymer, chlorinated polyethylene, elastomer, soft vinyl chloride and any mixtures thereof.

Group IV: alumina cement, magnesia cement and mixtures thereof.

Group V: copper, silver, zinc, aluminum, gallium, indium, tin, lead bismuth and any mixtures thereof.

(a) compression Molding

The magnetic material of the present invention is kneaded with one of the binders of Group II, placed in a mold and subjected to compression molding with or without applying a magnetic field. Then the mold is heated to harden the shaped article in the mold, which is then taken out of the mold and magnetized or demagnetized to obtain a bonded magnet.

When one of the binders of Group V is employed, the compression molding is conducted in a metal- or ceramic-mold under heating to obtain a bonded magnet. When one of the binders of Group IV is employed, the binder which is diluted with a solvent is mixed and kneaded with the magnetic material and the compression molding is conducted in a mold with demagnetization or magnetization.

(b) Injection Molding

The magnetic material of the present invention is mixed and kneaded with one of the binders of Group III, formed into particles and then subjected to injection molding using a magnet injection molding machine. The shaped article thus obtained is demagnetized or magnetized to give a bonded magnet.

(c) Compacting Molding

The magnetic material of the present invention is placed in a mold and subjected to pressure molding in a magnetic field. The shaped article was taken out of the mold, and impregnated with one of the binders of Group I which is diluted with or dissolved in a solvent capable of dissolving the binder, such as methanol, toluene and cyclohexane. Alternatively, the abovementioned diluted or dissolved binder is pressurized into the taken-out, shaped article. Then the solvent is vaporized to dry the shaped article, thereby obtaining a bonded magnet.

(d) Simple Molding

The magnetic material of the present invention is mixed and kneaded with one of the binders of Group IV diluted with a solvent and molded in a mold with demagnetization or magnetization and the shaped article taken out of the mold is dried by vaporizing the solvent.

Furthermore, when an organic compound, i.e., a compound of Groups I to III is used as the binder in the preparation of a bonded magnet by compression molding, injection molding or compacting molding as described above, use of a coupling agent is effective for increasing the adhesion of the particulate magnetic material to the binder to thereby improve the magnetic properties and mechanical properties of the bonded magnet. Any conventional coupling agent can be used as the coupling agent. Suitable example are organic metal coupling agents, such as titanium type coupling agents including isopropyltriisostearoyl titanate, isopropyltri(N-aminoethyl-aminoethyl) titanate, tetraisopropyl titanate and tetrabutyl titanate; and silicone type coupling agents including N-$\beta$-(aminoethyl)-$\gamma$-aminopropyl trimethoxysilane, $\gamma$-aminopropyltriethoxysilane and methyltrimethoxysilane.

The following examples are given to illustrate the present invention in greater detail.

In the present invention, the quantitative analysis of the nitrogen, hydrogen and oxygen was conducted by subjecting the alloy powder of the present invention to an inert gas fusion in impulse furnace-thermal conductivity analysis by analyzers [manufactured by Horiba, Ltd., Japan, "EMGA-620 (for analysis of nitrogen and oxygen)" and "EMGA-1110 (for analysis of hydrogen)"].

The quantitative analysis of the rare earth metal and iron was conducted, for example by, firstly, confirming the presence or absence of $\alpha$-Fe phase and $Sm_1Fe_3$ phase by X-ray diffraction and confirming that the alloy or the alloy powder was mostly $Sm_2Fe_{17}$ phase alone by X-ray diffraction and, secondly, quantitatively analyzing the Sm and Fe contents by inductively coupled plasma emission spectrometry using a spectrometer (manufactured by Seiko Instrument & Electronics Ltd., Japan).

The magnetic properties of the alloy powder of the present invention were measured by a vibrating sample magnetometer (manufactured by Toei Industry Co., Ltd., Japan).

The average crystal size of the starting alloy was measured by the Jeffry method using the scanning electron photomicrographs and optical photomicrographs of the starting alloy which had been polished with diamond paste and etched with diluted nitric acid. Example 1

Alloy ingots of, by atomic percent, 10.5 R -89.5 Fe composition wherein R was Sm, Ce, Nd or Gd, were prepared by the high frequency melting of Fe and one of Sm, Ce, Nd and Gd each having a purity of 99.9% in an argon atmosphere, followed by pouring of the melt in an iron mold and cooling of the mold. The ingots thus obtained were annealed at 1250° C. for 4 hours, 950° C. for 64 hours, 1050° C. for 12 hours and 1250° C. for 7 hours, respectively, in an argon atmosphere having a partial pressure of oxygen of about $10^{-5}$ atm. The annealed alloy ingots thus prepared were coarsely crushed in a jaw crusher in a nitrogen atmosphere and then pulverized in a coffee mill in a nitrogen atmosphere to an average particle size of about 100 $\mu$m.

The alloy powder thus obtained was placed in a tabular furnace and, a mixed gas of ammonia gas having a partial pressure of 0.35 atm and hydrogen gas having a partial pressure of 0.65 atm was introduced into the tubular furnace at a rate of 200 cc/minute at 465° C. for 2 hours to conduct nitriding and hydriding and then, the alloy powder was annealed in an argon atmosphere having a partial pressure of oxygen of about $10^{-4}$ atm at 465° C. for 3 hours and subsequently cooled at 30° C. in the argon atmosphere.

In a 50 cc glass pot were placed 1 g of the alloy powder thus obtained, 50 g of stainless steel balls having a diameter of 3 mm and then cyclohexane having 0.002% by weight of water and having 40 ppm of dissolved oxygen in an amount of 80% by volume based on the volume of the glass pot, and ball milling for fine pulverization was conducted for 4 hours at a rotating rate of 350 r.p.m.

Then the glass pot was placed in a glove box whose atmosphere was nitrogen and, the alloy powder was taken out of the glass pot and dried. As a result, 90% by volume of the alloy powder thus prepared had a particle size of from 1 to 5 $\mu$m.

The alloy powder was admixed with copper powder as a binder and then compression-molded in a magnetic field of 15kOe under a pressure of 2 ton/cm$^2$. The magnetic properties of the resultant were measured by a vibrating sample magnetometer (manufactured by Toei Industry Co., Ltd., Japan).

The compositions and the magnetic properties of the alloy powder before and after the fine pulverization are shown in Table 1 and Table 2.

TABLE 1

| Run No. | Alloy Powder Composition before Fine Pulverization (atomic %) | | | | | Magnetic Properties | |
|---|---|---|---|---|---|---|---|
| | R | Fe | N | H | O | $4\pi Is$ (G) | iHc (Oe) |
| 1 | Sm 8.9 | 74.9 | 15.6 | 0.2 | 0.4 | 13800 | 610 |
| 2 | Ce 8.6 | 73.2 | 17.3 | 0.1 | 0.8 | 14200 | 50 |
| 3 | Nd 9.4 | 80.0 | 9.3 | 0.6 | 0.7 | 14000 | 140 |
| 4 | Gd 10.2 | 76.7 | 12.6 | 0.2 | 0.3 | 10000 | 40 |

TABLE 2

| Run No. | Alloy Powder Composition after Fine Pulverization (atomic %) | | | | | Magnetic Properties | |
|---|---|---|---|---|---|---|---|
| | R | Fe | N | H | O | $4\pi Is$ (G) | iHc (Oe) |
| 1 | Sm 8.5 | 71.5 | 14.7 | 2.0 | 3.3 | 12100 | 8200 |
| 2 | Ce 8.1 | 69.1 | 15.9 | 2.1 | 4.8 | 13000 | 300 |
| 3 | Nd 8.7 | 74.1 | 8.4 | 2.4 | 6.4 | 12200 | 390 |
| 4 | Gd 9.7 | 73.1 | 11.8 | 1.5 | 3.9 | 9500 | 120 |

Example 2

An alloy ingot of, by atomic percent, 10.5 Sm -89.5 Fe was prepared by the high frequency melting of Fe and Sm each having a purity of 99.9% in an argon atmosphere followed by pouring of the melt in an iron mold and cooling of the mold. The ingot thus obtained was annealed at 1250° C. for 3 hours in an argon atmosphere having a partial pressure of oxygen of about $10^{-5}$ atm.

The alloy thus prepared was pulverized in a coffee mill in a nitrogen atmosphere to obtain particles having a particle size distribution of 20 to 106 μm.

The alloy powder thus obtained was placed in a tubular furnace and a mixed gas of ammonia gas having a partial pressure of 0.4 atm and hydrogen gas having a partial pressure of 0.6 atm was introduced into the tubular furnace at a rate of 200 cc/minute at 450° C. for one hour to conduct nitriding and hydriding and then, the alloy powder thus obtained was annealed in an argon atmosphere having a partial pressure of oxygen of about $10^{-5}$ atm at 450° C. for 30 minutes and cooled to 20° C. in the argon atmosphere.

Then the alloy powder thus obtained was subjected to fine pulverization in the same manner as in Example 1 to obtain alloy powder, 90% by volume of which had a particle size of 1 to 5 μm.

In each of the above described steps, sampling was carried out and, the quantitative analysis of nitrogen, hydrogen and oxygen was conducted. Also the iHc of these samples was measured. The results are shown in FIG. 1.

The same experiment as described above was further repeated twice to confirm the reproducibility and to average the analytical values. The distribution of the analytical values was within ±5% of the average value.

From FIG. 1, it will be understood that the increase in iHc by the increase in nitrogen content after nitriding and hydriding is small while the increase in iHc by the increase in oxygen content in fine pulverization is drastic and, the hydrogen content after nitriding and hydriding which is about 2.5 atomic percent, decreases to about 0.25 atomic percent after annealing and increases again to about 2.5 atomic percent.

The magnetic properties were measured in the same manner as in Example 1.

Example 3

An alloy ingot of, by atomic percent, 10.5 Sm -62.7 Fe - 26.8 Co composition was prepared by the high frequency melting of Fe, Sm and Co each having a purity of 99.9% in an argon atmosphere, followed by pouring of the melt in an iron mold and cooling of the mold. The alloy ingot thus obtained was annealed at 900° C. for 24 hours in an argon atmosphere having a partial pressure of oxygen of about $10^{-5}$ atm.

The alloy thus prepared was pulverized in a coffee mill in a nitrogen atmosphere to an average particle size of 100 μm.

Then this alloy powder was heated at 470° C. for 60 minutes in a mixed gas of hydrogen gas having a partial pressure of 0.33 atm and ammonia gas having a partial pressure of 0.67 atm to conduct nitriding and hydriding and then, the alloy powder thus obtained was annealed at 460° C. for about one hour in an argon atmosphere having a partial pressure of oxygen of $10^{-5}$ atm and cooled to 25° C. in the argon atmosphere.

In the same manner as in Example 1 the alloy powder thus obtained was ball milled for fine pulverization until particles, 90% by volume of which had a particle size of 1 to 5 μm, were obtained.

The compositions and the magnetic properties of the alloy powder before and after the fine pulverization are shown in Table 3.

TABLE 3

| Sample | Alloy Powder Composition (atomic %) | | | | | | Magnetic Properties | |
|---|---|---|---|---|---|---|---|---|
| | Sm | Fe | Co | N | H | O | $4\pi Is$ (G) | iHc (Oe) |
| before* | 8.5 | 50.8 | 21.8 | 18.3 | 0.2 | 0.4 | 14200 | 560 |
| after** | 8.1 | 48.4 | 20.6 | 17.3 | 2.2 | 3.4 | 12900 | 7100 |

*before: before fine pulverization
**after: after fine pulverization

The magnetic properties were measured in the same manner as in Example 1.

Example 4

Five types of alloy powder having, by atomic percent, 10.5-11.0 Sm-89.5-89.0 Fe compositions and showing a homogeneous composition formula of $Sm_2Fe_{17}$ by X-ray diffraction analysis were individually pulverized in the same manner as in Example 2 to thereby obtain particles having a particle size distribution of 20 μm to 100 μm.

The alloy powder thus obtained was placed in a tubular furnace, and a mixed gas of ammonia gas having a partial pressure of 0.4 atm and hydrogen gas of 0.6 atm was introduced into the tubular furnace at a rate of 200 cc/minute at 450° C. for one hour to conduct nitriding and hydriding and then, the alloy powder was annealed in an argon atmosphere at 450° C. for one hour and subsequently cooled to 25° C. in the argon atmosphere to obtain alloy powder having five types of the compositions which are shown in Table 4.

TABLE 4

| Sample No. | Alloy Powder Composition (atomic %) | | | | |
|---|---|---|---|---|---|
| | Sm | Fe | N | H | O |
| 1 | 9.10 | 74.88 | 15.27 | 0.07 | 0.68 |
| 2 | 9.01 | 76.06 | 14.28 | 0.12 | 0.54 |
| 3 | 9.05 | 76.43 | 13.76 | 0.15 | 0.61 |
| 4 | 9.03 | 75.55 | 14.78 | 0.06 | 0.58 |
| 5 | 9.03 | 76.22 | 14.01 | 0.12 | 0.62 |

In a 50 cc glass pot were placed 2 g of each of the alloy powders thus obtained, stainless balls having a diameter of 3 mm in an amount of about 30% by volume based on the volume of the pot and, the pot was then filled up with cyclohexane containing 20 ppm of water and 40 ppm of dissolved oxygen, and ball milling was carried out at a rotating rate of 350 r.p.m. by varying the milling time from one hour to 10 hours.

As a result, the iHc of the alloy powder gradually increased and reached 10000 Oe.

Then the alloy powder with the respective iHc was packed in a WC mold having a rectangular hole of 5 mm×10 mm, uniaxially oriented in a magnetic field of 15 kOe and pressed under a pressure of 1 ton/cm$^2$. The mold was placed in a pressurizing device and pressed under a pressure of 12 tons/cm$^2$ and then, the shaped article taken out of the mold was magnetized in a magnetic field of 60 kOe to obtain compacting-molded magnets. The (BH)max values of the magnets thus obtained were measured.

Figure 2:
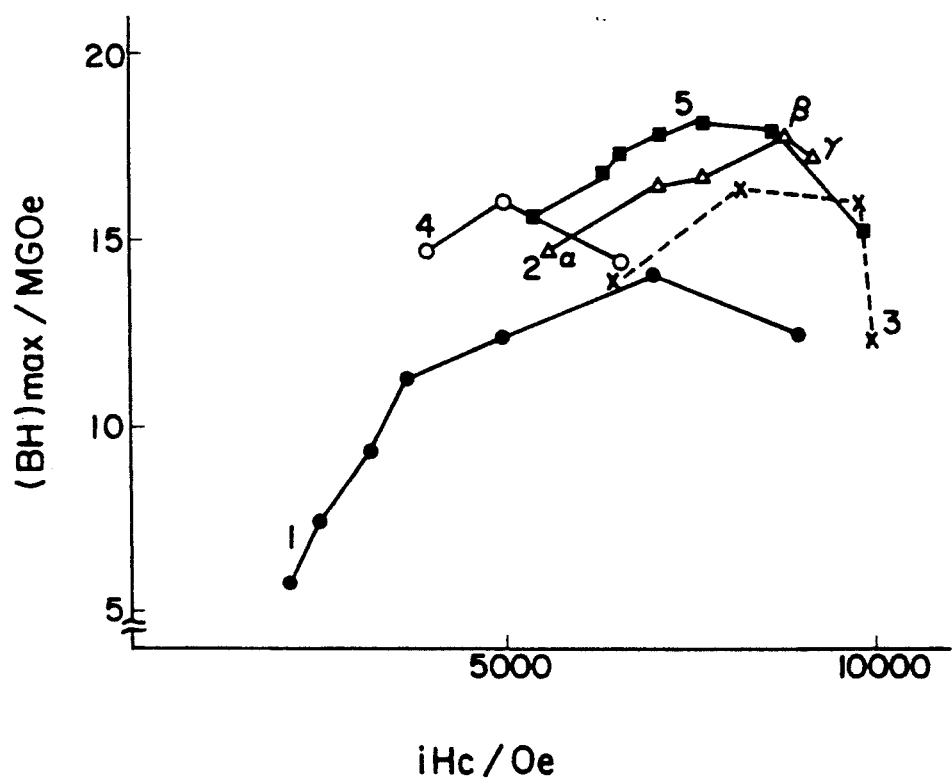
FIG. 2 is a graph showing the relationships between the iHc values of the alloy powder samples and the (BH)max values of the compacting-molded magnets obtained from the alloy powder samples, with respect to the samples obtained in Example 4.
Figure 4:
FIGS. 3 to 7 are scanning electron photomicrographs showing the microstructures of the alloy powder samples used for preparing FIG. 2.
Figure 3:
Figure 6:
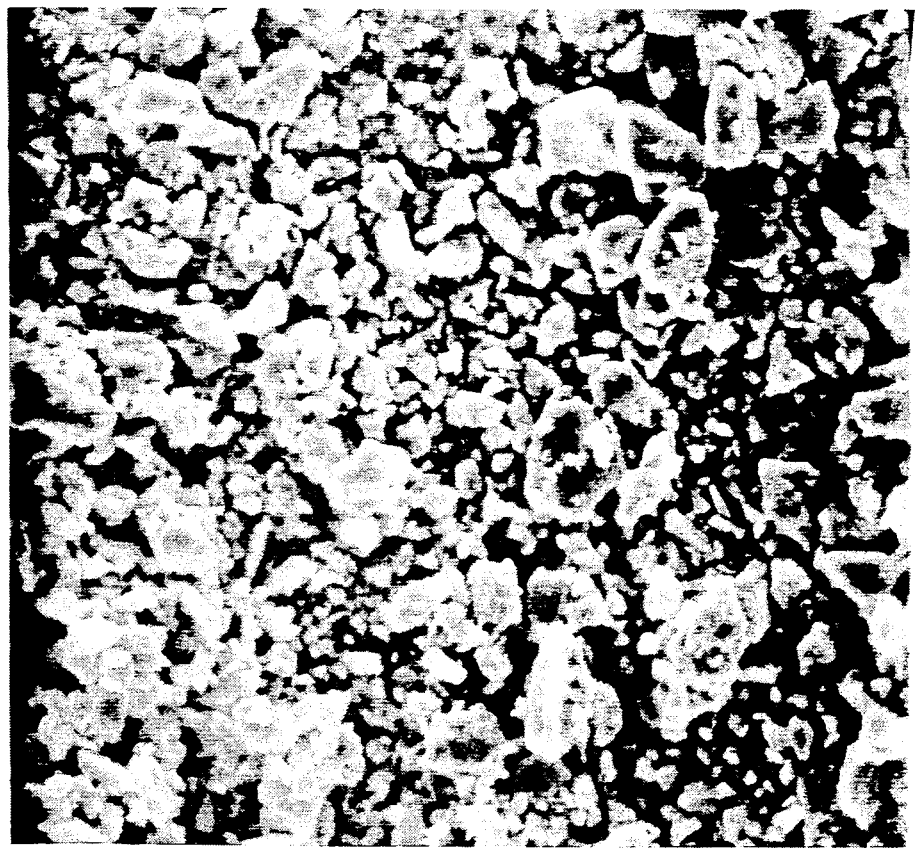
Figure 5:
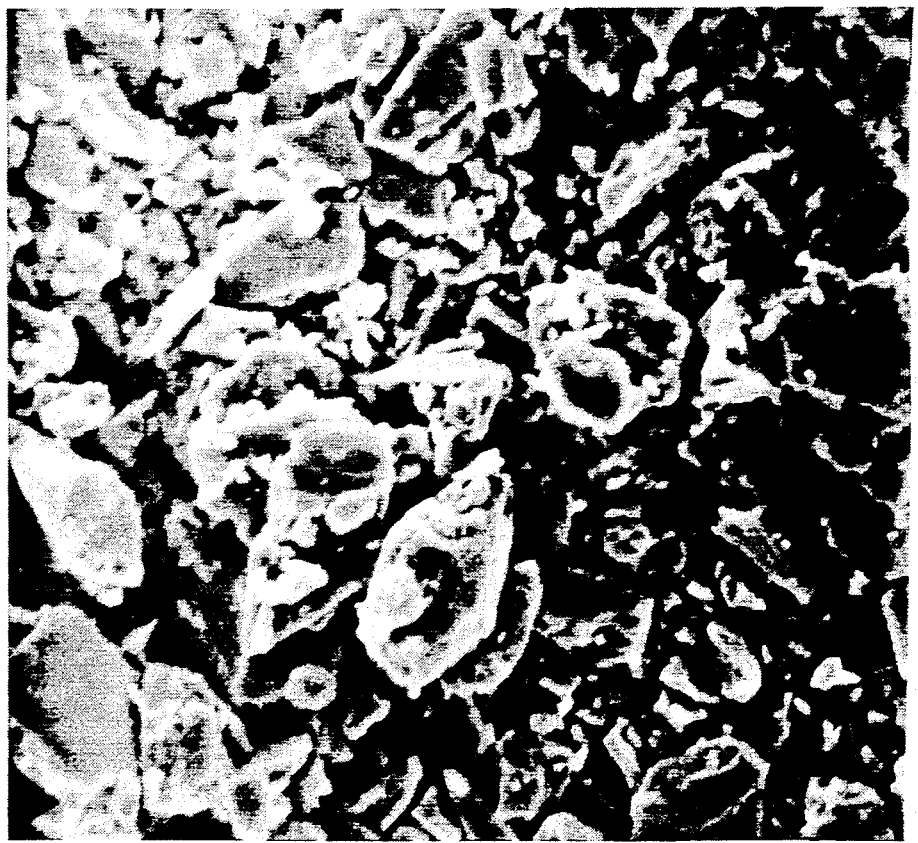
Figure 7:
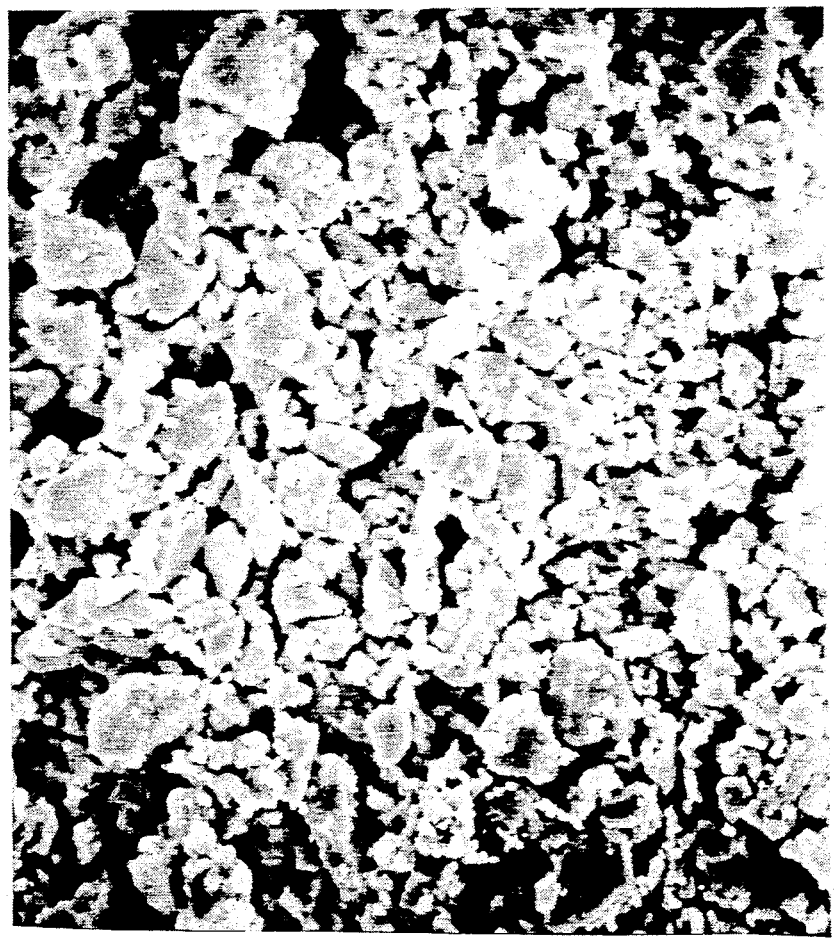

FIG. 2 shows the relationship between the iHc of the alloy powder and the (BH)max of the compacting-molded magnet obtained from the alloy powder.

It can be understood from FIG. 2 that a maximum value of the (BH)max is obtained when the iHc is in the range of from 7000 to 9000 Oe.

FIGS. 3 to 7 are scanning electron photomicrographs of the microstructures of the alloy powder of Sample No. 2 before the fine pulverization, the alloy powder having an iHc of 2500 Oe after the fine pulverization, the alloy powder designated α in FIG. 2, i.e., having an iHc of 5800 Oe after the fine pulverization, the alloy powder designated β in FIG. 2, i.e., having an iHc of 8400 Oe after the fine pulverization and the alloy powder designated γ in FIG. 2, i.e., having an iHc of 8900 Oe after the fine pulverization, respectively.

From FIG. 2 and FIGS. 3 to 7, it will be understood that the increase in iHc depends on the fine pulverization of the alloy particles.

Furthermore, the alloy powder of Sample No. 2 and that of Sample No. 5 were, individually, finely pulverized in the same manner as described above by varying the pulverization time from one hour to 10 hours and sampling the finely pulverized powder every one hour for measuring the amount of oxygen, and compacting-molded magnets were prepared by using the sampled powders in the same manner as described above and their iHc and (BH)max values were measured.

Figure 8:
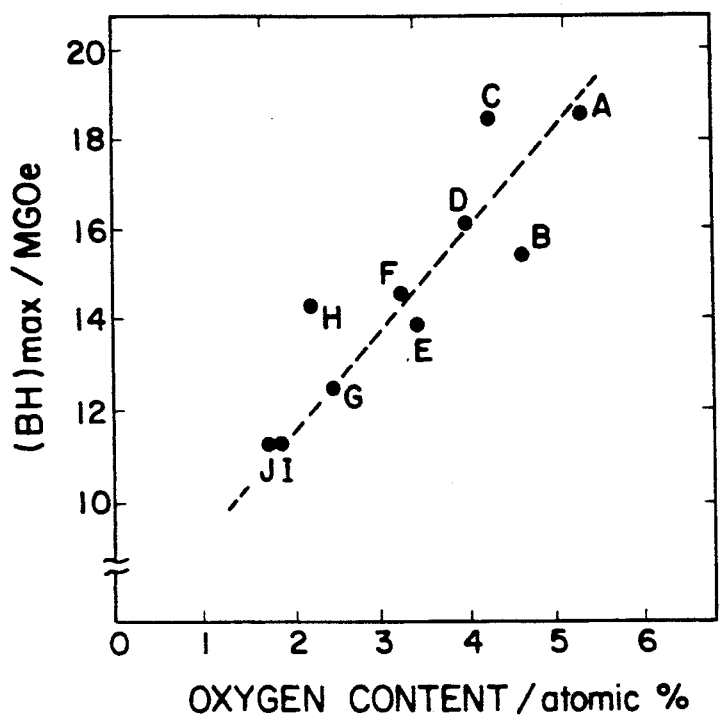
FIG. 8 is a graph showing the relationships between the oxygen contents of the alloy powder samples after fine pulverization with respect to Nos. 2 and 5 samples of Example 4 and the (BH)max values of the compacting-molded magnets obtained from the alloy powder samples.

FIG. 8 shows the relationship between the oxygen content of the alloy powder after the fine pulverization and the (BH)max of the magnet obtained from the alloy powder. From FIG. 8 it will be understood that the (BH)max increases according to the increase of the oxygen content toward 5 atomic percent.

Figure 9:
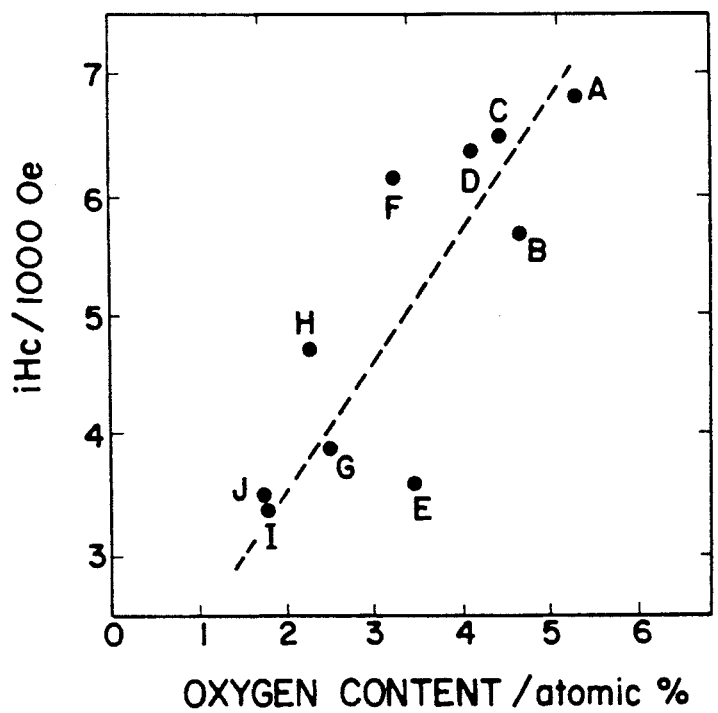
FIG. 9 is a graph showing the relationships between the oxygen contents of the alloy powder samples after fine pulverization with respect to Nos. 2 and 5 samples and the iHc values of the compacting-molded magnets obtained from the alloy powder samples.

FIG. 9 shows the relationship between the oxygen content of the alloy powder after the fine pulverization and the iHc of the magnet obtained from the alloy powder. From FIG. 9 it will be understood that the iHc at the oxygen content of about 5 atomic percent is about 6800 Oe.

In FIGS. 8 and 9, characters A to J are those are arbitrarily assigned to the measured samples.

Furthermore, the alloy powder designated H in FIGS. 8 and 9 having an iHc of 4700 Oe and a (BH)max of 14.1 MGOe was mixed with oleic acid in which fine particles of magnetite (Fe$_3$O$_4$) having a particle size of 0.2 μm had been dispersed, and subjected to ultrasonic dispersion and then, precipitated. The magnetite employed was in such an amount as to decrease, to some extent, the transparency of oleic acid which would return to the transparency of oleic acid after the ultrasonic dispersion and the precipitation.

Figure 10:
FIG. 10 is a scanning electron photomicrograph showing the single magnetic domain grains of the magnetic material of the present invention, obtained in Example 4.

The particles precipitated were separated by filtration and dried in air and then subjected to gold vacuum evaporation to obtain samples for measuring the size of single magnetic domain grains by scanning electron microscopy. The result of the measurement is shown in FIG. 10. From FIG. 10, it will be understood that the size of the single magnetic domain grains is about 2 to 4 μm in a shorter axis.

Figure 11:
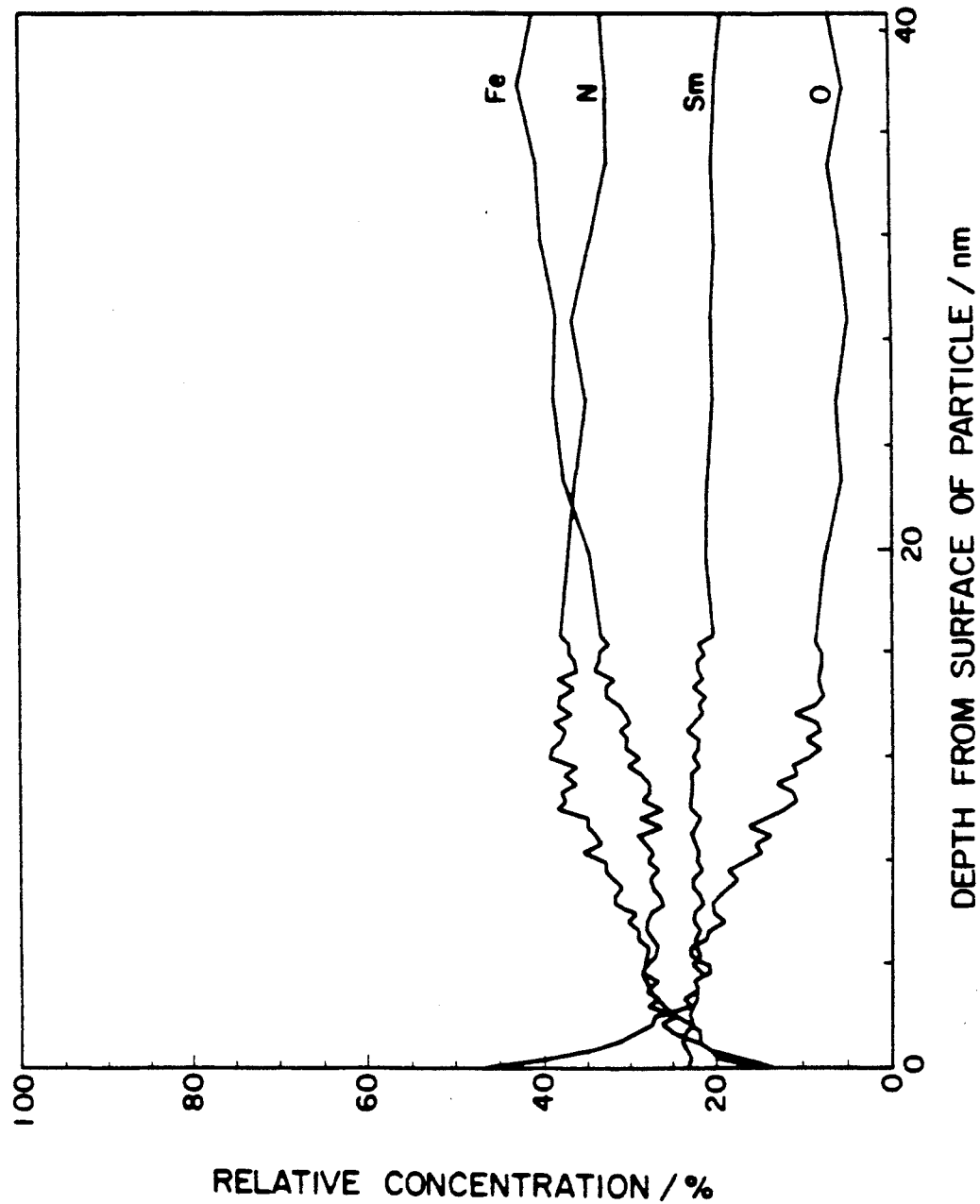
FIG. 11 is a graph showing the concentration distributions of Sm, Fe, N and 0 along the depth of the magnetic material particle, which were taken from the surface of a particle of a magnetic material obtained in Example 5 to a depth of 40 nm by Auger electron spectroscopy.

Further, the alloy powder designated H in FIG. 8 and 9 having an iHc of 4700 Oe and a (BH)max of 14.1 MGOe was softly pressed on an indium substrate and the analysis of the concentration distribution of Sm, Fe, N and O in the surface portion from the surface of a particle of the alloy powder to a depth of 40 nm was conducted by Auger electron spectroscopy (using an equipment manufactured by Nihon Densi Co., Ltd., Japan, "JAMP-7100 Auger Electron Spectroscopy") at an acceleration potential of 10 kV at a sputtering rate of 20 Å/minute. The results are shown in FIG. 11.

Example 5

An alloy ingot of, by atomic percent, 12 Sm - 88 Fe composition was prepared as follows. Fe having a purity of 99.9% was melted in a ceramic mold in a high frequency furnace under a reduced pressure of 10$^{-4}$ atm. Then argon gas was introduced into the furnace and Sm having a purity of 99.9% was mixed with the Fe melt under a reduced pressure of −30 mmHg and subjected to high frequency melting at a temperature of about 1550° C. for 5 minutes. The mixed melt thus obtained which was maintained at about 1550° C. was poured into an iron mold and the mold was cooled to 30° C. The alloy ingot thus obtained was taken out of the mold, crushed in a nitrogen atmosphere to obtain particles having a particle size distribution of 50 μm to 100 μm, placed in a tubular furnace and annealed at 1255° C. for 4 hours while introducing argon gas at a rate of 200 cc/minute to the tubular furnace and then, cooled to 25° C. in the argon gas.

The alloy powder thus obtained was heated at 465° C. for 2 hours in a mixed gas of ammonia gas having a partial pressure of 0.35 atm and hydrogen gas having a partial pressure of 0.65 atm to conduct nitriding and hydriding, annealed at 465° C. for one hour in argon gas and cooled to 25° C. to obtain an alloy powder of, by atomic percent, 8.89 Sm - 75.61 Fe - 14.85 N - 0.15 H - 0.50 O composition.

The alloy powder thus obtained was ball milled for fine pulverization in the same manner as in Example 1 except that the period of time for the ball milling was varied as shown in Table 5. The average particle size, the N, H and O contents and the iHc of the finely pulverized alloy powder thus obtained are shown in Table 5.

TABLE 5

| Run No. | Time for Fine Pulverization (minute) | Average Particle Size (μm) | Magnetic Property iHc (Oe) | Alloy Powder Composition (atomic %) | | |
|---|---|---|---|---|---|---|
| | | | | N | H | O |
| 1 | 0 | 40 | 1800 | 14.9 | 0.15 | 0.50 |
| 2 | 15 | 10 | 3100 | 14.8 | 0.32 | 0.98 |
| 3 | 60 | 7 | 5600 | 14.5 | 0.74 | 2.20 |
| 4 | 300 | 3 | 8800 | 13.8 | 1.22 | 4.97 |

Figure 12:
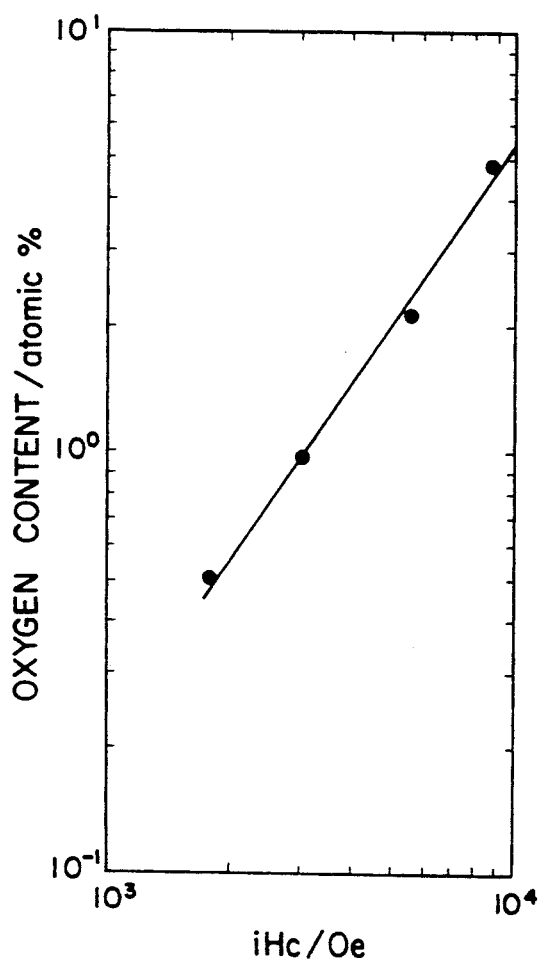
FIG. 12 is a graph showing the relationships between the iHc values of the alloy powder samples obtained in Example 5 and the oxygen contents of the alloy powder samples.
Figure 13:
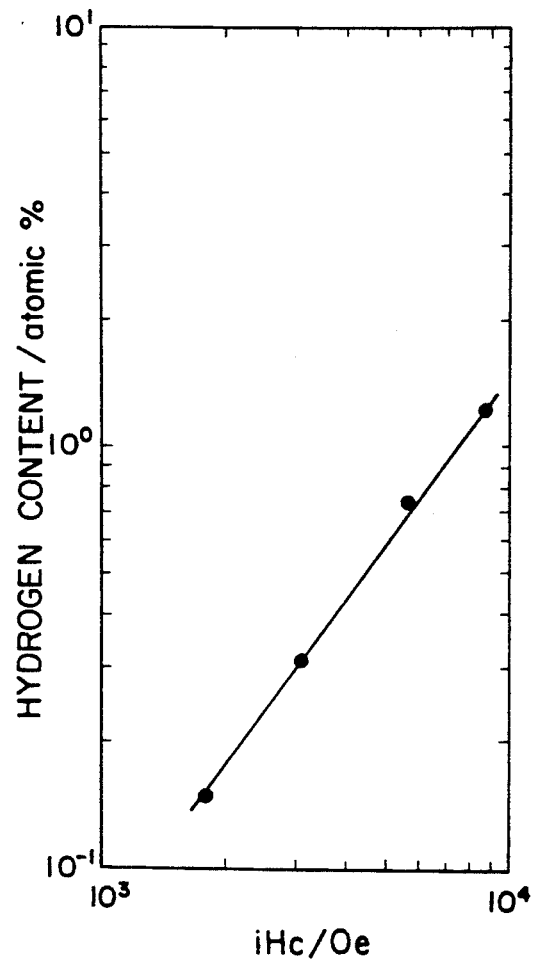
FIG. 13 is a graph showing the relationships between the iHc values of the alloy powder samples obtained in Example 5 and the hydrogen contents of the alloy powder samples.

FIG. 12 shows the relationship between the iHc of the finely pulverized alloy powder and the oxygen content and FIG. 13 shows the relationship between the iHc of the finely pulverized alloy powder and the hydrogen content. It will be understood from FIGS. 12 and 13 that the iHc of the finely pulverized alloy powder has a linear relationship with the oxygen content or the hydrogen content.

The magnetic properties were measured in the same manner as in Example 1.

Example 6

Alloy powder having a, by atomic percent, 10.5 Sm - 89.5 Fe composition and having a particle size distribution of 20 μm to 100 μm, which is designated "Powder B'", was prepared in the same manner as in Example 2, except that the annealing temperature and time were, respectively, changed to 1100° C. and 12 hours. The same procedure as described above was repeated to obtain an alloy powder which is designated "Powder C'".

The same alloy having a, by atomic percent, 10.5 Sm - 89.5 Fe composition and having a particle size distribution of 20 μm to 100 μm as used in Example 2 which is designated "Powder A'", Powder B' and Powder C' were individually placed in a tubular furnace and, a mixed gas of ammonia gas having a partial pressure of 0.35 atm and hydrogen gas of 0.65 atm were introduced into the tubular furnace at 450° C. for one hour at a rate of 200 cc/minute to conduct nitriding and hydriding and the Powder A', Powder B' and Powder C' thus treated were annealed at 450° C. for 2 hours in an argon atmosphere having a partial pressure of $10^{-4}$ atm and cooled to 25° C. in the argon atmosphere.

Then, Powder A', Powder B' and Powder C' thus obtained were individually placed in a 100 cc glass vessel and, stainless steel balls having a diameter of 3 mm were placed in the vessel in an amount of 30% by volume based on the volume of the vessel and then the vessel was filled up with cyclohexane containing 0.002% by weight of water and 60 ppm of dissolved oxygen to conduct ball milling for fine pulverization for 4 hours at a rotating rate of 350 r.p.m. Then the vessel was placed in a glove box whose atmosphere was nitrogen and the finely pulverized alloy powder was taken out of the vessel and dried. The compositions and magnetic properties of the alloy powders thus obtained are shown in Table 6.

On a glass laboratory dish having a diameter of 50 mm was spread 0.3 g of each of Powder A', Powder B' and Powder C' thus finely pulverized, individually, so that the powder was sufficiently contacted with air and then, the dish was placed in a thermostat maintained at a predetermined temperature. The alloy powder was then taken out from the thermostat after a predetermined period of time for measuring the $4\pi Is$ and iHc.

That is, Powder A' was maintained at 125° C. and 150° C. individually, Powder B' was maintained at 175° C., and Powder C' was maintained at 200° C. The measurement of the $4\pi Is$ and iHc of the alloy powder was done after the maintenance at the above temperature for 1 minute, 2 minutes, 3 minutes, 5 minutes, 7.5 minutes, 10 minutes, 15 minutes, 20 minutes, 40 minutes and 80 minutes. The decrease in each of $4\pi Is$ and iHc was observed. The results are shown in FIGS. 14 and 15.

TABLE 6

| Starting Alloy Powder | Alloy Powder Composition (atomic %) | | | Magnetic Properties | | |
|---|---|---|---|---|---|---|
| | N | H | O | $4\pi Is$ (kG) | iHc (Oe) | Magnetic Anisotropy ratio ($\sigma_\perp/\sigma_\parallel$) |
| Powder A' | 14.0 | 1.10 | 3.50 | 12.8 | 5900 | 0.320 |
| Powder B' | 14.1 | 1.38 | 4.70 | 11.9 | 7680 | 0.298 |
| Powder C' | 14.0 | 1.22 | 3.60 | 11.5 | 7800 | 0.345 |

FIG. 14 shows the relationship between the oxygen content and the decrease in $4\pi Is$. As will be understood from FIG. 14, the $4\pi Is$ is decreased with the increase of oxygen content, and the proportional constant is about −4.5.

FIG. 15 shows the relationship between the oxygen content and the decrease in iHc. The iHc is abruptly decreased when the oxygen content becomes 4 to 6 atomic percent. The variation of the iHc is small when the oxygen content is from 6 to about 9 atomic percent. The iHc is recovered when the oxygen content reaches 9 atomic percent. When the oxygen content reaches 12 atomic percent, the iHc is recovered to about 70% of the iHc of the finely pulverized alloy powder before the heat treatment in air in the thermostat.

The magnetic properties were measured in the same manner as in Example 1.

Example 7

The same alloy powder having a, by atomic percent, 10.5 Sm - 89.5 Fe composition and having a particle size distribution of 20 μm to 100 μm as in Example 2 was heated at 470° C. for one hour in a mixed gas of ammonia gas having a partial pressure of 0.35 atm and hydrogen gas having a partial pressure of 0.65 atm to conduct nitriding and hydriding and then annealed at 470° C. for 30 minutes in an argon atmosphere having a partial pressure of oxygen of about $10^{-4}$ atm and, subsequently cooled to 25° C. in the argon atmosphere.

The alloy powder thus obtained was classified to obtain only the particles having a particle size of 38 to 53 μm. 1 g of the particles thus separated was ball milled in the same manner as in Example 1 except that the period of time for ball milling was changed to 5 hours to obtain particles, 90% by volume of which had a particle size of 1 μm to 5 μm. The alloy powder thus obtained had 8.4 Sm - 72.1 Fe - 15.8 N - 0.2 H - 3.5 O.

Then the alloy powder was packed in a WC mold having a rectangular hole of 5 mm × 10 mm, uniaxially oriented in a magnetic field of 15 kOe and pressed under a pressure of 10 tons/cm² to obtain a compacting-molded magnet having the following magnetic properties.

| (BH)max | 19.6 MGOe |
|---|---|
| iHc | 7500 Oe |

Furthermore, an alloy powder of, by atomic percent, 8.4 Sm - 72.1 Fe - 15.8 N - 0.2 H - 3.5 O composition was mixed individually with 10% by weight of each of Zn, Sn, In and Cu as the binder, packed in the same WC mold as described above, and the resultants were, respectively, hot-pressed at a temperature of 420° C., 200° C., 200° C. and 330° C. for 2 hours under a pressure of 14 tons/cm² in an argon atmosphere to obtain magnets having a sufficient mechanical strength. The compositions and the magnetic properties of the magnets thus obtained are shown in Table 7.

TABLE 7

| Run No. | Alloy Powder Composition (atomic %) | | | | | | Magnetic Properties | |
|---|---|---|---|---|---|---|---|---|
| | Sm | Fe | N | H | O | Me | (BH)max (MGOe) | iHc (Oe) |
| Starting Alloy Powder | 8.4 | 72.1 | 15.8 | 0.2 | 3.5 | — | 19.6 | 7500 |
| 1 | 7.7 | 66.4 | 14.3 | 0.04 | 3.8 | Zn 7.8 | 18.5 | 6200 |
| 2 | 8.0 | 68.6 | 14.8 | 0.06 | 3.4 | Sn 5.1 | 18.3 | 6350 |
| 3 | 8.0 | 68.6 | 14.7 | 0.07 | 3.3 | In 5.3 | 19.5 | 6450 |
| 4 | 7.9 | 66.6 | 14.0 | 0.04 | 3.5 | Cu 8.1 | 19.1 | 6450 |

Example 8

The same magnetic powder having a, by atomic percent, 8.4 Sm - 72.1 Fe - 15.8 N - 0.2 H - 3.5 O composition and having an iHc of 7500 Oe as obtained in Example 7 was mixed with 3% by weight of a bisphenol A type epoxy resin (product of Asahi Kasei Kogyo K.K., Japan; tradename "AER 331") as the binder and 0.8% by weight of diaminodiphenylmethane and the mixture was packed in a WC mold having a rectangular hole of 5 mm × 10 mm, uniaxially oriented in a magnetic field of 15 kOe and pressed under a pressure of 10 tons/cm². The shaped article thus obtained was subjected to heat treatment at 150° C. for 2 hours in a nitrogen atmosphere to obtain a compression-molded magnet. The properties of the magnet were as follows;

| (BH)max | 17.6 MGOe |
|---|---|
| iHc | 7200 Oe |

Example 9

An alloy ingot of, by atomic percent, 10.5 Sm - 89.5 Fe composition was prepared by the high frequency melting of Fe and Sm each having a purity of 99.9% in an argon atmosphere, followed by pouring of the melt in an iron mold and cooling of the mold. The alloy ingot thus obtained was annealed at 1250° C. for 2 hours in an argon atmosphere having a partial pressure of oxygen of about $10^{-5}$ atm. Then the alloy ingot thus obtained was coarsely crushed in a jaw crusher in a nitrogen atmosphere and then pulverized in a coffee mill in a nitrogen to an average particle size of 70 μm.

The alloy powder thus obtained was placed in a tubular furnace, and a mixed gas of ammonia gas having a partial pressure of 0.4 atm and hydrogen gas having a partial pressure of 0.6 atm was introduced into the tubular furnace at 450° C. for 3 hours at a flow rate of 200 cc/minute to conduct nitriding and hydriding and then, the alloy powder was annealed at 450° C. for 30 minutes in an argon atmosphere having a partial pressure of oxygen of about $10^{-4}$ atm and subsequently cooled to 25° C. in the argon atmosphere to obtain an alloy powder of, by atomic percent, 8.9 Sm - 75.8 Fe - 14.6 N - 0.2 H - 0.5 O composition.

In a 5 liter-polyamide pot were placed 300 g of the alloy powder obtained above and 4 kg of ceramic balls having a diameter of 3 mm and the pot was filled up with cyclohexane containing 30 ppm of water and 3 ppm of dissolved oxygen and, ball milling for fine pulverization was carried out for 13 hours at a rotating rate of 60 r.p.m.

164 g of the alloy powder of, by atomic percent, 8.4 Sm - 71.6 Fe - 13.8 N - 1.3 H - 4.9 O composition as obtained after the fine pulverization was mixed with an ethanol solution containing 2.95 g of isopropyl tri(N-aminoethyl-aminoethyl)titanate and 0.33 g of N-β-(aminoethyl)-γ-aminopropyl-trimethoxysilane in a mixer for 3 minutes and then, the mixture were added with 18.2 g of nylon-12 powder, mixed for 2 minutes and heated at 120° C. for 30 minutes at 10 Torr to recover the ethanol. Then the mixture thus obtained was placed in a 40 cc kneader of batchwise type and kneaded at 260° C. for 20 minutes at a rate of 50 r.p.m. and then taken out of the kneader and cut into pellets having a size of 1 to 3 mm. The above described procedure was repeated to obtain about 2 kg of pellets.

Then three types of pieces, i.e., a cubic of 10 mm (one side), a disk of 15 mm (diameter) × 5 mm (thickness) and a ring of 20 mm (outer diameter) × 8 mm (width) × 1 mm (thickness) were prepared under the following conditions by using the pellets obtained above.

| Injection Temperature | 285° C. |
|---|---|
| Mold Temperature | 90° C. |
| Injection pressure | 1 ton/cm² |
| Mold Clamping Force | 20 tons |
| Magnetic Field | 15 kOe |

The appearance of the molded articles thus obtained had luster and was beautiful without any shrink marks, and the distribution in dimension was less than ±0.1% of the average value, with the average roughness of the surface of less than 0.07 mm. The magnetic properties of the cubic as the test piece were as follows:

| Br | 5.7 kG |
|---|---|
| (BH)max | 5.8 MGOe |
| iHc | 5.2 kOe |

Example 10

In the same manner as in Example 5 was obtained an alloy powder having a, by atomic percent, 8.84 Sm - 75.1 Fe - 15.4 N - 0.12 H - 0.54 O composition and having a particle size distribution of 20 μm to 100 μm. Then the alloy powder thus obtained was ball milled for fine pulverization in the same manner as in Example 1 except that the liquid media shown in Table 8 were employed and the period of time for the ball milling was changed to 5 hours. Subsequently, the finely pulverized alloy powder was compacting-molded in the same manner as in Example 4 to obtain compacting-molded magnets. The amounts of N, H and O and the magnetic properties of the magnets thus obtained are shown in Table 8.

TABLE 8

| Run No. | Organic Medium | Amount of Water (weight %) | Amount of Dissolved Oxygen (ppm) | Alloy Powder Composition (atomic %) | | | Magnetic Properties | | | |
|---|---|---|---|---|---|---|---|---|---|---|
| | | | | N | H | O | (BH)max (MGOe) | $4\pi$Is (kG) | iHC (Oe) | Br/$4\pi$Is (%) |
| 1 | cyclohexane | 0.002 | 50 | 13.45 | 2.92 | 3.64 | 16.0 | 9.75 | 7800 | 94.7 |
| 2 | petroleum benzine | 0.0005 | 10 | 13.62 | 2.13 | 3.00 | 12.6 | 9.90 | 3900 | 95.3 |
| 3 | ethanol | 0.3 | 400 | 13.15 | 3.69 | 4.67 | 13.1 | 10.4 | 3700 | 94.7 |
| 4 | methanol | 2 | 70 | 13.12 | 3.74 | 4.77 | 14.2 | 10.2 | 4800 | 94.7 |
| 5 | chloroform | 0.01 | 10 | 13.40 | 3.31 | 3.20 | 14.6 | 9.77 | 5800 | 95.8 |

TABLE 8

| Run No. | Organic Medium | Amount of Water (weight %) | Amount of Dissolved Oxygen (ppm) | Alloy Powder Composition (atomic %) | | | Magnetic Properties | | | |
|---|---|---|---|---|---|---|---|---|---|---|
| | | | | N | H | O | (BH)max (MGOe) | $4\pi$Is (kG) | iHC (Oe) | Br/$4\pi$Is (%) |
| 1 | cyclohexane | 0.002 | 50 | 13.45 | 2.92 | 3.64 | 16.0 | 9.75 | 7800 | 94.7 |
| 2 | petroleum benzine | 0.0005 | 10 | 13.62 | 2.13 | 3.00 | 12.6 | 9.90 | 3900 | 95.3 |
| 3 | ethanol | 0.3 | 400 | 13.15 | 3.69 | 4.67 | 13.1 | 10.4 | 3700 | 94.7 |
| 4 | methanol | 2 | 70 | 13.12 | 3.74 | 4.77 | 14.2 | 10.2 | 4800 | 94.7 |
| 5 | chloroform | 0.01 | 10 | 13.40 | 3.31 | 3.20 | 14.6 | 9.77 | 5800 | 95.8 |

Example 11

An alloy ingot of, by atomic percent, 10.5 Sm - 89.5 Fe composition was prepared by arc melting of Sm having a purity of 99.9% by weight and Fe having a purity of 99.9% by weight in a water-cooled boat in an argon atmosphere. The alloy ingot thus obtained was annealed at 800° C. for two weeks.

Then the annealed alloy ingot was crushed in a jaw crusher in a nitrogen atmosphere and subsequently in a coffee mill in a nitrogen atmosphere to obtain particles having a particle size distribution of 20 μm to 106 μm.

The alloy powder thus obtained was placed in a tubular furnace, and a mixed gas of ammonia having a partial pressure of 0.4 atm and hydrogen having a partial pressure of 0.6 atm was introduced into the tubular furnace at a rate of 200 cc/minute at a temperature of 450° C. for 2 hours to conduct nitriding and hydriding and then, argon gas was introduced into the tubular furnace at 450° C. for 2.5 hours. Subsequently, the alloy powder was slowly cooled to 20° C. in argon. The alloy powder thus obtained is designated Powder A".

Powder A" was classified into two groups of particles by a sieve, i.e., one group of particles having a particle size of more than 74 μm and the other group of particles having a particle size of up to 74 μm.

Each group of particles was individually placed in a stainless steel cylindrical vessel together with 50 g of stainless steel balls having a diameter of 3 mm and cyclohexane containing 20 ppm of water and 40 ppm of dissolved oxygen and then, finely pulverized in a rotary ball mill for a period of time shown in Table 9.

After the fine pulverization, the vessel was placed in a glove box and the alloy powder was taken out of the vessel and dried. As a result, an alloy powder having a, by atomic percent, 8.1 Sm - 69.1 Fe - 15.4 N - 2.0 H - 5.4 O composition, 90% by volume of which had a particle size distribution of 1 μm to 5 μm, was obtained.

Then each group of the finely pulverized powder was kneaded with 5% by weight of polyisoprene dissolved in toluene and placed in a WC mold having a rectangular hole of 1 cm × 0.5 cm and then, uniaxially oriented in the horizontal direction in a magnetic field of 15 kOe and pressed under a pressure of 1 ton/cm² and then under a pressure of 12 tons/cm² to obtain a bonded magnet.

The magnetic properties of the bonded magnets thus obtained are shown in Table 9.

The above-described procedure was repeated except that Powder A" as such was employed for the preparation of bonded magnets, and the magnetic properties of the bonded magnets thus prepared are also shown in Table 9.

TABLE 9

| Run No. | Particle Size Classified from Powder A" (μm) | Ball Milling Time (hour) | Magnetic Properties | | | |
|---|---|---|---|---|---|---|
| | | | $4\pi$Is (kG) | Br (kG) | iHc (kOe) | (BH)max (MGOe) |
| 1 | <74 | 3 | 9 | 8.5 | 7 | 15.5 |
| 2 | ≧74 | 3.33 | 9.3 | 8.3 | 6.2 | 14.7 |
| 3 | no classification | 3 | 8.9 | 7.9 | 6.4 | 14.2 |
| 4 | no classification | 3.33 | 9.1 | 7.5 | 6.8 | 13.5 |

Example 12

Powder A" obtained in Example 11 was classified into 4 groups of particles as shown in Table 10. Then each group of particles was finely pulverized in the same manner as in Example 11 by ball milling for a period of time as shown in Table 10 to obtain an alloy powder, 90% by volume of which had a particle size of 1 to 5 μm. Bonded magnets were prepared using the obtained alloy powder in the same manner as in Example 11. The magnetic properties of the magnets thus obtained are shown in Table 10.

TABLE 10

| Run No. | Particle Size Classified from Powder A" (μm) | Ball Milling Time (hour) | Magnetic Properties | | | |
|---|---|---|---|---|---|---|
| | | | $4\pi$Is (kG) | Br (kG) | iHc (kOe) | (BH)max (MGOe) |
| 1 | 20-38 | 3 | 9.1 | 8.9 | 7.2 | 16.5 |
| 2 | 38-53 | 3 | 9.4 | 9.1 | 7.1 | 16.8 |
| 3 | 53-74 | 3.33 | 9.5 | 9.3 | 7.0 | 16.9 |
| 4 | 74-90 | 3.33 | 9.4 | 8.8 | 6.8 | 16.5 |

Example 13

The same particles having a particle size distribution of 20 μm to 106 μm as obtained by the coffee milling pulverization in Example 11 were classified to obtain only the particles having a particle size distribution of 50 μm to 106 μm.

Then the nitriding and hydriding and the subsequent annealing were carried out in the same manner as in Example 11 to obtain particles having a particle size distribution of 20 μm to 106 μm which showed occurrence of pulverization to some extent in the course of the nitriding and hydriding.

Subsequently, the alloy powder thus obtained was classified to obtain only the particles having a particle size distribution of 20 μm to 38 μm and then, the particles thus classified were pulverized by ball milling for 3 hours in the same manner as in Example 11 to obtain alloy powder of, by atomic percent, 8.1 Sm - 69.1 Fe - 15.2 N - 2.1 H - 5.5 O. In the same manner as in Example 11, a bonded magnet was prepared by using the obtained alloy powder. The magnetic properties of the bonded magnet were as follows;

| | |
|---|---|
| 4πIs | 9.9 kG |
| Br | 9.6 kG |
| iHc | 7.6 kOe |
| (BH)max | 18.3 MGOe |

The magnetic properties were remarkably improved as compared to those of Run Nos. 3 and 4 of Example 11.

Example 14

First, Fe and Sm each having a purity of 99.9% were individually weighed in such an amount as to obtain an alloy ingot of, by atomic percent, 11.4 Sm - 88.6 Fe composition and the Fe was placed in a ceramic mold in a high frequency furnace and melted under a reduced pressure of about $10^{-4}$ atm. While introducing argon gas into the furnace, the Sm was mixed with the Fe melt under a reduced pressure of $-30$ mmHg and subjected to high frequency melting at a temperature of about 1600° C. for 5 minutes. The obtained mixed melt maintained at a temperature of about 1600° C. was poured into an iron mold having a width of 3 mm and then, the mold was cooled to 25° C. The alloy ingot thus obtained was taken out of the mold, crushed to obtain particles having a size of 2 to 3 cm³, placed in a tubular furnace and annealed at temperatures of 940° C., 1095° C. and 1255° C., individually, for periods of time varying from 45 minutes to 32 hours, while introducing argon gas at a rate of 200 cc/minute to the tubular furnace, and was subsequently cooled to 25° C. in the argon gas.

Figure 16:
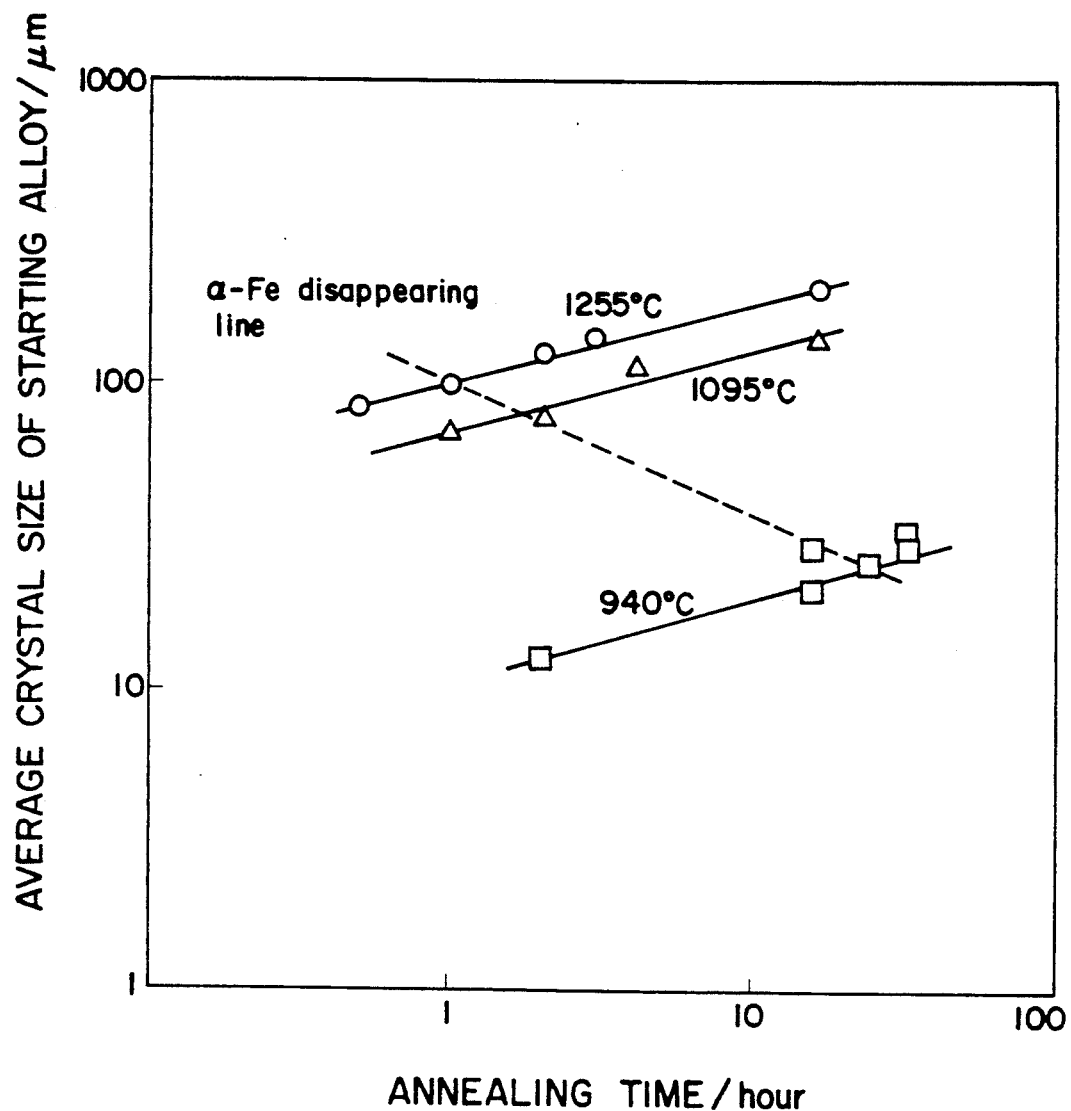
FIG. 16 is a graph showing the change of the average crystal size of the starting alloy prepared in Example 14 with the increase in the annealing time and also showing the change of the annealing period time for the $\alpha$-Fe phase to disappear from the starting alloy.

FIG. 16 shows the variation of the average crystal size of the starting alloy with the increase in the annealing time in argon gas and shows the variation of the time for the α-Fe phase to disappear. In FIG. 16, the annealing conditions where the α-Fe phase disappears from the starting alloy after the annealing and from the starting alloy composed only of a mixed phase of the $Sm_1Fe_3$ phase and the $Sm_2Fe_{17}$ phase, are in the region above the dotted line. As clearly understood from FIG. 16, the starting alloy from which the α-Fe phase had disappeared had an average crystal size of about 25 μm to about 150 μm under the experimental conditions of this Example.

Furthermore, the same treatment as described above was repeated except that the width of the iron mold was changed from about 3 mm to about 1 mm and the annealing was carried out at 950° C. for about 24 hours. As a result, the α-Fe disappeared and the starting alloy had an average crystal size of 6 μm.

The starting alloys prepared above were, individually, coarsely pulverized in a coffee mill to obtain particles having a particle size distribution of 50 μm to 100 μm and then, heated at 465° C. for 2 hours in a mixed gas of ammonia gas having a partial pressure of 0.35 atm and hydrogen gas having a partial pressure of 0.65 atm to conduct nitriding and hydriding and then, annealed at 465° C. for 2.5 hours in argon gas, followed by cooling to 25° C. Then the alloy powder thus obtained had an average composition of 8.93 Sm - 75.35 Fe - 14.99 N - 0.05 H - 0.68 O and was classified into 8 groups of particles by using sieves of 20 μm to 106 μm and the magnetic properties of each group of particles were measured.

Figure 17:
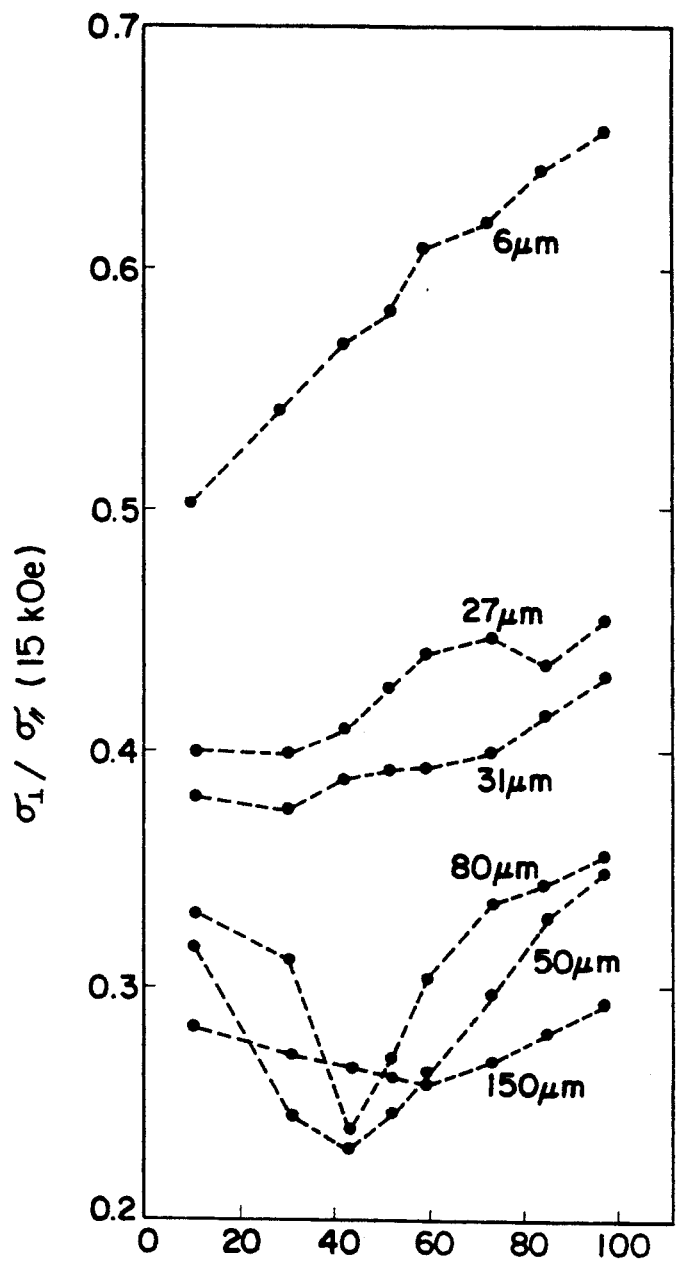
FIG. 17 is a graph showing the change of the magnetic anisotropy ratio according to the average particle size with respect to each classified alloy powder after the nitriding and hydriding in Example 14.

FIG. 17 shows the variation of the magnetic anisotropy ratio with respect to the average particle size of each classified alloy powder after the nitriding and hydriding. As mentioned above, the magnetic anisotropy ratio was evaluated in terms of the ratio ($\sigma\perp/\sigma_{//}$) of the magnetization in the direction of hard magnetization ($\sigma_{195}$) to that in the direction of easy magnetization ($\sigma_{//}$) at 15 kOe, and a smaller value of the magnetic anisotropy ratio is more preferred. As shown in FIG. 17, the average crystal size of the starting alloy are classified into three groups, i.e., first group of 150 μm, 80 μm and 50 μm, second group of 31 μm and 27 μm and third group of 6 μm. The difference between the first group and the second group is due to the annealing temperature which is above or below the melting point of the $Sm_1Fe_3$ phase. Furthermore, it is noted that the coarsely pulverized alloy powder having an average particle size similar to the average crystal size of the starting alloy tends to show a most preferred magnetic anisotropy ratio although the alloy powder obtained from the starting alloy having an average crystal size of 150 μm shows similar magnetic anisotropy ratio over the entire range of its particle size.

Figure 18:
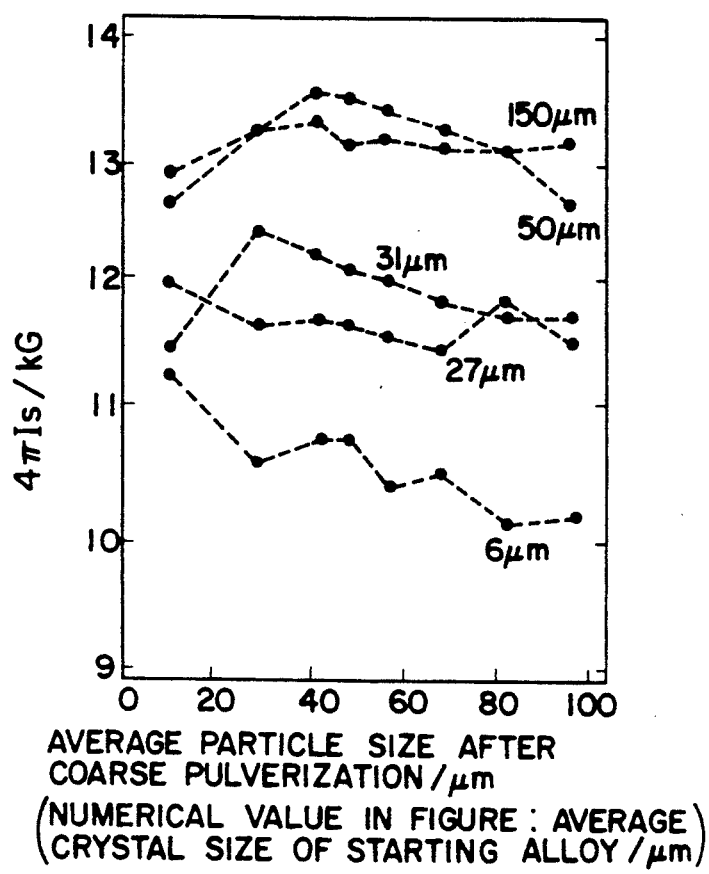
FIG. 18 is a graph showing the change of the $4\pi Is$ value according to the average particle size with respect to each classified alloy powder after the nitriding and hydriding in Example 16.

FIG. 18 shows the variation of the saturation magnetization (4πIs) with respect to the average particle size of the alloy powder classified after the nitriding and hydriding. As shown in FIG. 18, the first group (150 μm and 50 μm in average crystal size) of the starting alloy shows maximum 4πIs while the third group (6 μm in average crystal size) of the starting alloy shows minimum 4πIs. From FIG. 18, it will be understood that the coarsely pulverized alloy powder having an average particle size similar to the average crystal size of the starting alloy tends to show higher 4πIs.

As stated above, it will be understood that the average crystal size of the starting alloy affects the magnetic properties, i.e., 4πIs, iHc, $\sigma\perp/94_{//}$ and Br/4πIs.

Then the coarsely pulverized alloy powder after the nitriding and hydriding was classified with respect to each of the groups of coarsely pulverized powders obtained from the starting alloys respectively having average crystal sizes of 31 μm, 50 μm, 80 μm and 150 μm, to thereby obtain only the particles having a particle size of 20 μm to 38 μm and the particles thus classified were subjected to ball milling for fine pulverization in the same manner as in Example 1 to obtain finely pulverized particles, 80% by volume of which had a particle size of 1 μm to 5 μm.

The magnetic properties shown in FIGS. 17 and 18 were measured in the same manner as in Example 1.

Subsequently, compacting-molded magnets were prepared by using the finely pulverized particles in the same manner as in Example 7 and their magnetic properties are shown in FIG. 19. From FIG. 19, it will be understood that the starting alloy having an average crystal size of 31 μm shows maximum (BH)max, showing that the average crystal size of the starting alloy affects the magnetic properties of the finely pulverized alloy powder.

Example 15

1.0 kg of coarse powder of, by atomic percent, 8.9 Sm - 75.8 Fe - 14.6 N - 0.2 H - 0.5 O composition prepared in Example 9 was subjected to fine pulverization by means of a particle collision-type jet mill. In the fine pulverization, a nitrogen gas stream containing 1.3% of oxygen was fed under a feed gas pressure of 6.5 kg/cm², and the coarse powder was fed at a rate of 1 kg/hr. The resultant fine powder had an average particle size of 5.0 μm, and the composition, by atomic percent, thereof was 8.6 Sm - 73.3 Fe - 14.1 N - 1.0 H - 3.0 O. The fine powder was compression molded in substantially the same manner as described in Example 7. As a result, a bonded magnet was obtained, which exhibited the following magnetic properties:

| Br | 9.35 kG |
|---|---|
| iHc | 5.5 kOe |
| Br/4πIs | 91.7% |
| (BH)$_{max}$ | 14.3 MGOe |

What is claimed is:

1. A magnetic material represented by the formula:

$$R_\alpha Fe_{(100-\alpha-\beta-\gamma-\delta)} N_\beta H_\gamma O_{67}$$ (I)

wherein
R is at least one rare earth element inclusive of Y;
α is from 5 to 20 atomic percent,
β is from 5 to 25 atomic percent,
γ is from 0.01 to 5 atomic percent and
δ is from 3 to 15 atomic percent
said magnetic material being in the form of particles, at least 50 percent by volume of which are single magnetic domain grains having a particle size of from 1 μm to 5 μm,
at least 80 atomic percent of the oxygen, based on the total amount of the oxygen, being present in a surface portion of the particles,
and said magnetic material exhibiting a higher (BH)$_{max}$ when fabricated into a magnet than said magnetic material without oxygen.

2. The magnetic material of claim 1, wherein at least 80 percent by volume of the particles are single magnetic domain grains having a particle size of from 1 μm to 5 μm.

3. The magnetic material of claim 1, having magnetic properties such that when the magnet material is fabricated into a bonded mass having a magnet material content of 80% by volume, followed by magnetization in a pulse magnetic field of at least 30 kOe, the resultant bonded magnet exhibits a residual magnetization (Br) of at least 7 kG, an intrinsic coercive force (iHc) of at least 5000 Oe and a loop rectangularity (Br/4πIs) of at least 85%.

4. A magnetic material represented by the formula:

$$R_\alpha Fe_{(100-\alpha-\beta-\gamma-\delta)} N_\beta H_\gamma O_\delta$$ (I) 637 wherein
R is at least one rare earth element inclusive of Y;
α is from 5 to 20 atomic percent,
β is from 5 to 25 atomic percent,
γ is from 0.01 to 5 atomic percent,
δ is from 3 to 15 atomic percent,
and the Fe atoms are substituted by Co atoms in a substitution ratio of from 0.01 to 49 atomic percent of the Fe atoms,
said magnetic material being in the form of particles, at least 50 percent by volume of which are single magnetic domain grains having a particle size of from 1 μm to 5 μm,
at least 80 atomic percent of the oxygen, based on the total amount of the oxygen, being present in a surface portion of the particles,
and said magnetic material exhibiting a higher (BH)$_{max}$ when fabricated into a magnet than said magnetic material without oxygen.

5. The magnetic material of claim 4, wherein at least 80 percent by volume of the particles are single magnetic domain grains having a particle size of from 1 μm to 5 μm.

6. The magnetic material of claim 1 or 4, wherein R is at least one rare earth element selected from the group consisting of Nd, Pr, La, Ce, Tb, Dy, Ho, Er, Sm, Eu, Gd, Tm, Yb, Lu and Y.

7. The magnetic material of claim 6, wherein R is Sm.

8. The magnetic material of claim 6, wherein R is Ce.

9. The magnetic material of claim 6, wherein R is Nd.

10. The magnetic material of claim 6, wherein R is Gd.

11. A bonded magnet comprising: particles of at least one magnetic material represented by the formula:

$$R_\alpha Re_{(100-\alpha-\beta-\gamma-\delta)} N_\beta H_{65} O_{67}$$ (I)

wherein
R is at least one rare earth element inclusive of Y;
α is from 5 to 20 atomic percent,
β is from 5 to 25 atomic percent,
γ is from 0.01 to 5 atomic percent and
δ is from 3 to 15 atomic percent,
at least 50 percent by volume of the particles being single magnetic domain grains having a particle size of from 1 μm to 5 μm, at least 80 atomic percent of the oxygen, based on the total amount of the oxygen, being present in a surface portion of the particles, and
a binder interspersed between the particles to bond the particles together,
and said bonded magnet exhibiting a higher (BH)$_{max}$ than a bonded magnet as defined above, but where oxygen is absent from said magnetic material.

12. The bonded magnet of claim 11, wherein at least 80 percent by volume of the particles are single magnetic domain grains having a particle size of from 1 μm to 5 μm.

13. The bonded magnet of claim 11, wherein R is at least one rare earth element selected from the group consisting of Nd, Pr, La, Ce, Tb, Dy, Ho, Er, Sm, Eu, Gd, Pm, Tm, Yb, Lu and Y.

14. The bonded magnet of claim 11, having magnetic properties such than when the bonded magnet has a magnetic material content of 80% by volume and is magnetized in a pulse magnetic field of at least 30 kOe, the resultant bonded magnet exhibits a residual magnetization (Br) of at least 7 kG, an intrinsic coercive force (iHc) of at least 5000 Oe and a loop rectangularity (Br/4πIs) of at least 85%.

15. The bonded magnet of claim 14, wherein R is Sm.

16. A bonded magnet comprising:
particles of at least one magnetic material represented by the formula:

$$R_\alpha Fe_{(100-\alpha-\beta-\gamma-\delta)} N_\beta H_\gamma O_\delta \qquad (I)$$

wherein
R is at least one rare earth element inclusive of Y;
α is from 5 to 20 atomic percent,
β is from 5 to 25 atomic percent,
γ is from 0.01 to 5 atomic percent,
δ is from 3 to 15 atomic percent,
and the Fe atoms are substituted by Co atoms in a substitution ratio of from 0.01 to 49 atomic percent of the Fe atoms,
at least 50 percent by volume of the particles being single magnetic domain grains having a particle size of from 1 μm to 5 μm, at least 80 atomic percent of the oxygen, based on the total amount of the oxygen, being present in a surface portion of the particles, and
a binder interspersed between the particles to bond the particles together,
and said bonded magnet exhibiting a higher $(BH)_{max}$ than a bonded magnet as defined above, but where oxygen is absent from said magnetic material.

17. The bonded magnet of claim 16, wherein R is at least one rare earth element selected from the group consisting of Nd, Pr, La, Ce, Tb, Dy, Ho, Er, Sm, Eu, Gd, Pm, Tm, Yb, Lu and Y.

18. The bonded magnet of claim 16, wherein at least 80 percent by volume of the particles are single magnetic domain grains having a particle size of from 1 μm to 5 μm.

* * * * *